US007213114B2

(12) United States Patent
Nakano et al.

(10) Patent No.: US 7,213,114 B2
(45) Date of Patent: May 1, 2007

(54) REMOTE COPY FOR A STORAGE CONTROLLER IN A HETEROGENEOUS ENVIRONMENT

(75) Inventors: Toshio Nakano, Tokyo (JP); Katsunori Nakamura, Tokyo (JP); Mikito Ogata, Tokyo (JP); Yoshinori Okami, Tokyo (JP); Seiichi Higaki, Odawara (JP); Hiroshi Abei, Tokyo (JP); Shigeru Kishiro, Tokyo (JP); Teruo Nagasawa, Tokyo (JP); Takeshi Koide, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 455 days.

(21) Appl. No.: 10/917,800

(22) Filed: Aug. 12, 2004

(65) Prior Publication Data

US 2005/0120093 A1   Jun. 2, 2005

Related U.S. Application Data

(63) Continuation-in-part of application No. 10/382,872, filed on Mar. 7, 2003, now Pat. No. 6,950,917, and a continuation-in-part of application No. 10/096,375, filed on Mar. 8, 2002, now Pat. No. 7,082,506.

(51) Int. Cl.
G06F 12/00 (2006.01)
G06F 15/167 (2006.01)
G06F 3/00 (2006.01)

(52) U.S. Cl. .................. 711/162; 711/112; 709/217; 710/15

(58) Field of Classification Search ............... None
See application file for complete search history.

(56) References Cited

U.S. PATENT DOCUMENTS 3,990,055 A    11/1976   Henderson et al.

(Continued)

FOREIGN PATENT DOCUMENTS

| JP | 58-151660 | 9/1983 |
|---|---|---|
| JP | 58-219656 | 12/1983 |
| JP | 64-033770 | 2/1989 |
| JP | 02-059934 | 2/1990 |
| JP | 03-204023 | 9/1991 |
| JP | 06-067811 | 3/1994 |
| JP | 06-250795 | 9/1994 |
| JP | 07-191811 | 7/1995 |
| JP | 07-201132 | 8/1995 |
| JP | 07-271521 | 10/1995 |
| JP | 09-325863 | 12/1997 |
| JP | 11-338647 | 12/1999 |
| JP | 2000-305856 | 11/2000 |
| WO | WO 98/20419 A1 | 5/1998 |
| WO | WO 01/04754 A2 | 1/2001 |

OTHER PUBLICATIONS

Rosenblum "The Design and Implementation of a Log-Structured File System," ACM Transactions on Computer Systems, Feb. 1992, pp. 26-52, vol. 10, No. 1.

(Continued)

Primary Examiner—Reginald Bragdon
Assistant Examiner—Mehdi Namazi
(74) Attorney, Agent, or Firm—Townsend and Townsend and Crew LLP

(57) ABSTRACT

Two data centers located in the vicinity are connected using a synchronous transfer copy function, and one of the data centers is coupled with a third data center disposed at a remote location by an asynchronous remote copying function. The order whereat a storage sub-system located in the vicinity has received data from a host is consistently guaranteed, and the third data center holds the data. Further, each storage sub-system includes a function whereby, during normal operation, data can be exchanged and the data update state can be obtained by the storage sub-systems located in the two data centers that do not directly engage in data transmission.

7 Claims, 28 Drawing Sheets

U.S. PATENT DOCUMENTS

| | | | |
|---|---|---|---|
| 4,451,884 A | 5/1984 | Heath et al. | |
| 5,155,845 A | 10/1992 | Beal et al. | |
| 5,206,939 A | 4/1993 | Yanai et al. | |
| 5,235,690 A | 8/1993 | Beardsley et al. | |
| 5,247,665 A | 9/1993 | Matsuda et al. | |
| 5,379,398 A | 1/1995 | Cohn et al. | |
| 5,522,037 A | 5/1996 | Kitagawa et al. | |
| 5,544,347 A | 8/1996 | Yanai et al. | |
| 5,572,699 A | 11/1996 | Kamo et al. | |
| 5,588,012 A | 12/1996 | Oizumi | |
| 5,613,155 A | 3/1997 | Baldiga et al. | |
| 5,625,840 A | 4/1997 | Numata et al. | |
| 5,644,787 A | 7/1997 | Nakamura et al. | |
| 5,664,144 A | 9/1997 | Yanai et al. | |
| 5,680,580 A | 10/1997 | Beardsley et al. | |
| 5,680,640 A | 10/1997 | Ofek et al. | |
| 5,692,155 A | 11/1997 | Iskiyan et al. | |
| 5,740,465 A | 4/1998 | Matsunami et al. | |
| 5,742,792 A | 4/1998 | Yanai et al. | |
| 5,802,345 A | 9/1998 | Matsunami et al. | |
| 5,819,020 A | 10/1998 | Beeler | |
| 5,835,954 A | 11/1998 | Duyanovich et al. | |
| 5,845,328 A | 12/1998 | Maya et al. | |
| 5,896,548 A | 4/1999 | Ofek | |
| 5,901,327 A | 5/1999 | Ofek | |
| 5,909,692 A | 6/1999 | Yanai et al. | |
| 5,940,865 A | 8/1999 | Ohzora et al. | |
| 5,960,216 A | 9/1999 | Vishlitzky et al. | |
| 5,978,890 A | 11/1999 | Ozawa et al. | |
| 5,996,045 A | 11/1999 | Lee et al. | |
| 6,003,114 A | 12/1999 | Bachmat | |
| 6,173,377 B1 | 1/2001 | Yanai et al. | |
| 6,185,653 B1 | 2/2001 | Yanai et al. | |
| 6,230,239 B1 | 5/2001 | Sakaki et al. | |
| 6,240,494 B1 | 5/2001 | Nagasawa et al. | |
| 6,247,046 B1 | 6/2001 | Yanai et al. | |
| 6,286,085 B1 | 9/2001 | Jouenne et al. | |
| 6,378,054 B1 | 4/2002 | Karasudani et al. | |
| 6,418,509 B1 | 7/2002 | Yanai et al. | |
| 6,487,645 B1 | 11/2002 | Clark et al. | |
| 6,502,205 B1 | 12/2002 | Yanai et al. | |
| 6,539,462 B1 | 3/2003 | Mikkelsen et al. | |
| 6,578,120 B1 | 6/2003 | Crockett et al. | |
| 6,587,919 B2 | 7/2003 | Yanai et al. | |
| 6,587,935 B2 | 7/2003 | Ofek | |
| 6,594,744 B1 | 7/2003 | Humlicek et al. | |
| 6,625,705 B2 | 9/2003 | Yanai et al. | |
| 6,640,291 B2 | 10/2003 | Fujibayashi et al. | |
| 6,647,473 B1 | 11/2003 | Golds et al. | |
| 6,647,474 B2 | 11/2003 | Yanai et al. | |
| 6,647,476 B2 | 11/2003 | Nagasawa et al. | |
| 6,671,705 B1 | 12/2003 | Duprey et al. | |
| 6,760,723 B2 | 7/2004 | Oshinsky et al. | |
| 6,779,094 B2 | 8/2004 | Selkirk et al. | |
| 6,804,755 B2 | 10/2004 | Selkirk et al. | |
| 6,950,917 B2 | 9/2005 | Nagasawa et al. | |
| 2002/0015336 A1 | 2/2002 | Watkins et al. | |
| 2002/0116404 A1 | 8/2002 | Cha et al. | |
| 2003/0167419 A1 | 9/2003 | Yanai et al. | |
| 2004/0167942 A1 | 8/2004 | Oshinsky et al. | |

OTHER PUBLICATIONS

"Symmetrix Data Migration Services (SDMS)" EMC$^2$ Symmetrix ICDA Family Product Information, printed Jun. 2000, Web Update Jul. 2001.

Burns et al. "A Linear Time, Constant Space Differencing Algorithm," IEEE proceedings of the 1997 Performance, Computing, and Communications Conference pp. 429-436 (Feb. 1997).

Svobodova "File Servers For Network-Based Distributed Systems," ACM Computing Surveys 16:353—398 (Dec. 1984).

FIG. 4

TRANSFER STATE/BIT MAP

| BLOCK NUMBER | UPDATE FLAG | COUNTER VALUE | ---- |
|---|---|---|---|
| ---- | ---- | ---- | ---- |
| 3030 | 1 | 3 | ---- |
| 3031 | 0 | 0 | ---- |
| 3032 | 1 | 2 | ---- |
| ---- | ---- | ---- | ---- |
| 4032 | 1 | Over Flow | ---- |
| ---- | ---- | ---- | ---- |
|  |  |  |  |

GENERAL CONFIGURATION 2

GENERAL CONFIGURATION 3

FIG. 12

| BLOCK NUMBER 56 | BLOCK NUMBER 57 | BLOCK NUMBER 58 | BLOCK NUMBER 59 |
|---|---|---|---|

FIG. 13

| | |
|---|---|
| SEQUENCE NUMBER | 0 |
| BLOCK NUMBER | 56 |
| SEQUENCE NUMBER | 1 |
| BLOCK NUMBER | 57 |
| SEQUENCE NUMBER | 2 |
| BLOCK NUMBER | 58 |
| SEQUENCE NUMBER | 3 |
| BLOCK NUMBER | 59 |

FIG. 14

| BLOCK NUMBER SEQUENCE NUMBER | DATA | BLOCK NUMBER SEQUENCE NUMBER | DATA | BLOCK NUMBER SEQUENCE NUMBER | DATA |

FIG. 15

| | |
|---|---|
| SEQUENCE NUMBER | 0 |
| BLOCK NUMBER | 56 |
| CACHE NUMBER | 122 |
| SEQUENCE NUMBER | 3 |
| BLOCK NUMBER | 59 |
| CACHE NUMBER | 2 |
| SEQUENCE NUMBER | 1 |
| BLOCK NUMBER | 57 |
| CACHE NUMBER | 16 |

| OCCURRENCE OF BLOCKAGE AT STORAGE SUB-SYSTEM 2 (S171) |
| --- |
| GENERATE BIT MAP INDICATING DIFFERENCE FROM STORAGE SUB-SYSTEM 3 (S172) |
| COPY DIFFERENTIAL DATA FROM STORAGE SUB-SYSTEM 1 TO STORAGE SUB-SYSTEM 3 BASED ON BIT MAP (S173) |
| START TEMPORARY OPERATION (S174) |

REMOTE COPY FOR A STORAGE CONTROLLER IN A HETEROGENEOUS ENVIRONMENT

CROSS REFERENCE TO RELATED APPLICATIONS

This application is a continuation-in-part of U.S. application Ser. No. 10/096,375, filed Mar. 8, 2002 now U.S. Pat. No. 7,082,506 and of U.S. application Ser. No. 10/382,872, filed Mar. 7, 2003 now U.S. Pat. No. 6,950,917, the disclosures of which are included herein by reference for all purposes.

BACKGROUND OF THE INVENTION

The present invention relates to a large area data storage system wherein an external storage device can quickly recover from a blockage that occurs due to a disaster, and in particular, to a large area data storage system wherein three or more external storage devices located at distances of one hundred to several hundred kms perform complementary operations.

Disclosed in JP11338647, by the present inventor, is a method whereby doubling of a system or data is performed synchronously or asynchronously. Further, disclosed in JP2000305856, by the present inventor, is a technique for asynchronously copying data to a remote area.

As is described above, the present inventor has proposed asynchronous remote copy techniques whereby an external storage device (hereinafter referred to as a storage sub-system), without receiving special control information specifying data order, receives data from a large computer system, a server or a personal computer connected to a network, or another higher computer system (hereinafter referred to as a host), and employs asynchronous transmission to continuously write data to a remotely situated second storage sub-system, while constantly maintaining the order of the data.

Further, when data is to be copied using the synchronous transmission technique, the performance of the data update process between a host and a storage sub-system connected thereto interacts with the exercise of the copy control process between the storage sub-system and a second storage sub-system located in the vicinity or in a remote area. Therefore, macroscopically, data exchanged by the two storage sub-systems are constantly being matched, and the order in which the data are written is also obtained. When an appropriate data transfer path is selected, the copy process effected through the synchronous transfer of data can be performed even when the distance between the two storage sub-systems exceeds 100 km.

Recently, awareness has grown of how important are the safe storage and the maintenance of data, giving rise to the expression of many demands, originating in the data storage market, for viable disaster recovery systems. Conventional means devised to satisfy these demands generally provide for the synchronous and asynchronous transfer of data between two connected data storage points. However, further market sourced requests call for the inclusion of third and fourth data storage points (hereinafter referred to as data centers), and for the construction of comprehensive, or near comprehensive, disaster recovery systems to service these data centers.

The reasoning behind these requests is that so long as three or more data centers are established, even if a disaster strikes one of the data centers, the redundancy represented by the storage and maintenance of data at the remaining data centers will enable data to be recovered and will reduce the risk represented by the occurrence of a succeeding disaster.

According to the conventional technique, adequate consideration is not given for a case wherein three or more data centers have been established and I/O data is received from a host having a logical volume of only one storage sub-system, and the remote copy technique is used for transmissions to multiple data centers. For example, for an event wherein a data center is disabled by a disaster, little consideration is given as to whether a logical volume that guarantees data order can be maintained between two or more remaining data centers, whether the update state can be maintained and non-matching data can be removed, and whether a system that can copy data relative to a vicinity and a remote area can be re-constructed.

Since when a disaster will occur is an unknown, among a grouping of three or more data centers the order in which data is updated must be constantly maintained.

Therefore, a large area data storage system must be constructed wherein a specific function is not uniquely provided for a host and a plurality of remote copying systems are coupled together, wherein received data having the same logical volume is distributed to another storage sub-system situated at a nearby or a remote location, and wherein the storage sub-systems of data centers constantly guarantee the order in which data received from the host are updated.

To resolve the above problem, according to the invention, a large area data storage system copies data to another storage sub-system without providing a redundant logical volume for a storage sub-system.

Further, according to the present invention, the reconstruction of a large area storage system is assumed to be the recovery operation objective following a disaster. During normal operation, management information is directly exchanged by storage sub-systems that do not perform data transfer functions, and the data update state is monitored and controlled by each storage sub-system. Then, during a recovery operation (re-synchronization, or resync) following a disaster, only the difference between data stored in the storage sub-systems transmitted immediately before the disaster occurs, and the exchange of hosts (fail over) and the continuation of the application are performed immediately.

<To Constantly Guarantee the Order for Updating Data>

A supplementary explanation will now be given for the time range for holding a data order.

The I/O data issued by the host is written to the storage sub-system, and the host receives a data-write-complete notification from the storage sub-system before performing the next step. When the host does not receive a data-write-complete notification from the storage sub-system, or receives a blockage notification, the host does not normally issue the next I/O data. Therefore, the data writing order should be maintained when the storage sub-system performs a specific order holding process before and after it transmits a write-end notification to the host.

In the remote copy process performed by the synchronous transfer of data, the data to be transmitted and copied is written to a storage sub-system situated nearby or at a remote location (hereinafter referred to simply as a different location), and when a write-end notification is received from the storage sub-system at the different location, the write-end notification is reported to the host. Compared with when a remote copy process is not performed, remote copy time and data transfer time are increased, and the performance is delayed. When the connection distance for a remote copy process is extended, the processing time for the data transfer is increased, and the remote copy process causes the performance of the I/O process to be further deteriorated. One of the methods used to resolve this problem is the asynchronous transfer of data.

During the asynchronous transfer of data, upon receiving I/O data from the host, the storage sub-system transmits data to a storage sub-system at a different location, and returns a write-end notification to the host without waiting for the write-end notification from the storage sub-system at the different location. Thus, the transmission of data between the storage sub-systems is not associated with the I/O process performed by the host, and can asynchronously be performed with the I/O process of the host. However, unless the data is written to the storage sub-system in a different location in the order whereat the data was received from the host, the data order may not be maintained by the storage sub-system at the different location, and data non-matching may occur between the two storage sub-systems. The additional provision of a function that constantly guarantees the data order, is the best possible means by which to reduce occurrences of this problem.

Compared with the storage sub-system that has received the host I/O data, the updating of data in the storage sub-system at a different location is generally delayed. However, so long as the data is written to the storage sub-system following the order in which the data arrived from the host, there is no divergence in the data order, and the recovery from a blockage can be performed by a journal file system or a database recovery process.

There is another method by which, without maintaining data order, the remote copying of the data order to a storage sub-system at a different location and the reflection of the data can be performed. According to this method, data from the host that have been received up to a specific time are transmitted to a different location and are collectively written to the storage sub-system. When the data received up to a specific time have been written, the data transfer process is terminated, and thereafter, data transfer by remote copying is halted until collective writing is next performed, and while data transfer is halted, the data order and the consistency of the I/O data received from the host is guaranteed.

According to this method, the function for providing the data order information is not required. A specific amount of data to be updated is stored and is collectively transmitted, and when the writing of data to a remote side has been completed, the data matching is guaranteed. According to this method, however, when a blockage occurs during remote copying, the data is not updated while the data updating order on the remote side is maintained, so that all the data are lost. Only during a period in which the data transfer by remote copying is halted can the data matching be guaranteed and be called adaptive.

The technique of the present inventor of the "remote copying by the asynchronous transfer of data for constantly guaranteeing the data order" includes a feature that, before returning an end notification to the host, the storage sub-system performs a process for guaranteeing the data order. Since regardless of the overheard in the controller of the storage sub-system, or the delay time for the internal process, management is provided for the data order information for each block before returning the end notification to the host, the data order can be consistently guaranteed.

Actually, the data order information is managed or controlled for each block during a time considerably shorter than the interval whereat the host issues the I/O. The time out (Timeout) value for the distribution of data to the storage sub-system at the remote location is set for at least one hour. The importance of this is that the remote copy technique of the present invention transmits data, together with order information, to a data block and writes the data in order in accordance with the order information. This is possible, so long as the order is correct, because even when between the local and remote systems the time lag for the updating of data is half a day, for example, this is much better than when, due to the non-matching of data, all the updated data are lost.

SUMMARY OF THE INVENTION

According to one aspect of the present invention, a three data center storage system includes first, second, and third storage sub-systems. One of the storage sub-systems is configured as a remote copy site to receive synchronous data transfers from another of the storage sub-systems (designated as a main data center). The remote copy site is further configured with a path replacement controller and a communication path to the main data center.

Another aspect of the present invention includes a three data center storage system having a new data center. The new data center is configured with a path replacement controller and a communication path to the main data center component of the three data center storage system.

BRIEF DESCRIPTION OF THE DRAWINGS

Aspects, advantages and novel features of the present invention will become apparent from the following description of the invention presented in conjunction with the accompanying drawings, wherein:

FIG. 4 is a diagram showing an example transfer state/bit map for implementing the present invention;

FIG. 12 is a conceptual diagram of a block constituting a unit for managing data in a storage resource for explaining a method for managing data matching through an asynchronous transfer of data according to one embodiment of the present invention;

FIG. 13 is a conceptual diagram showing data management information for explaining the management method for data matching through an asynchronous transfer of data according to the embodiment of the present invention;

FIG. 14 is a conceptual diagram showing the transferred data format for explaining the management method for data matching through an asynchronous transfer of data according to the embodiment of the present invention;

FIG. 15 is a conceptual diagram showing data management information, which is managed by a storage sub-system 2, for explaining the management method for data matching through an asynchronous transfer of data according to the embodiment of the present invention;

DESCRIPTION OF THE SPECIFIC EMBODIMENTS

Storage sub-systems located at three or more data centers are interconnected by synchronous transfers of data, and by an asynchronous remote copy technique for constantly and sequentially guaranteeing the order of data. Thus, a storage sub-system of a primary data center receives data from a host, and transmits the data to each of the storage sub-systems of the data centers at the remaining two or more points, while maintaining the order wherein the host updated the data.

Since the data is thereby rendered redundant while maintenance of the order wherein the host updated the data is guaranteed, even when a disaster or a blockage occurs at the primary data center, the storage sub-systems of the remaining data centers need only transmit the differential data among themselves, so that the recovery of the remote copy operation can be quickly effected or the data loss can be minimized.

<Synchronization and Asynchronization>

Figure 5:
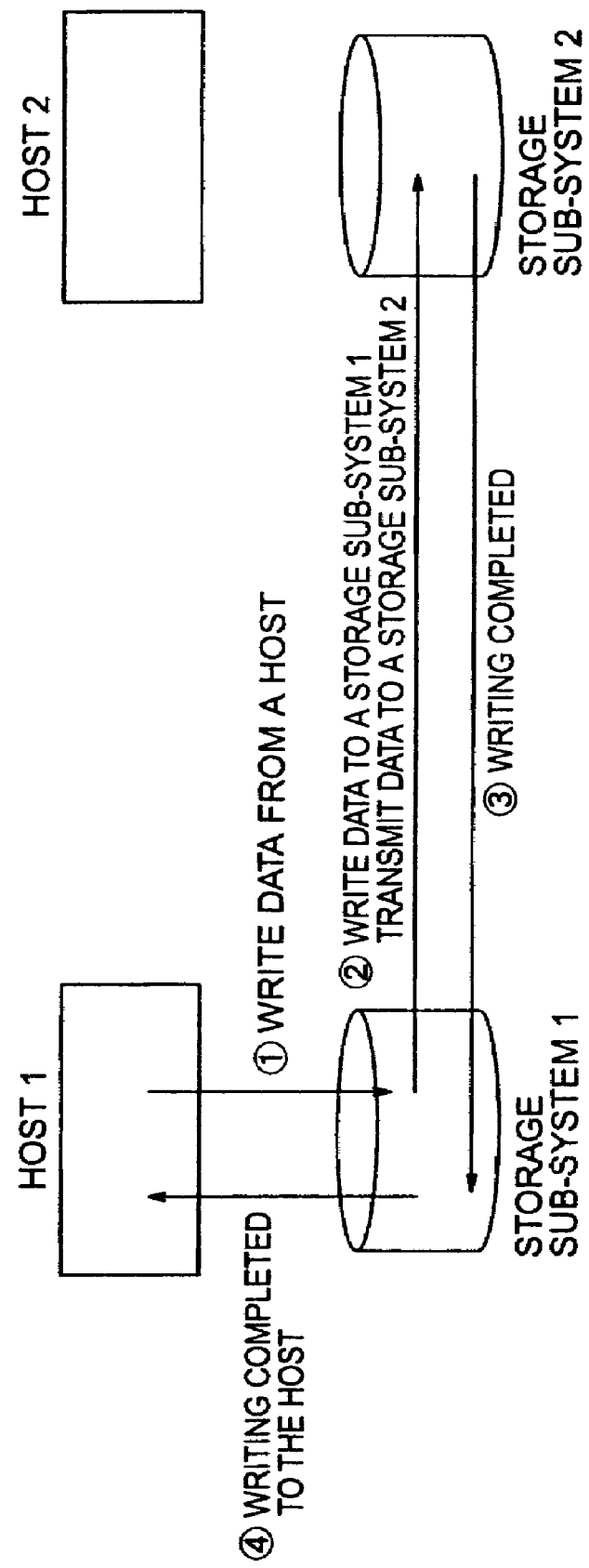
FIG. 5 is a schematic diagram for explaining the copying control through a general synchronous transfer of data.
Figure 6:
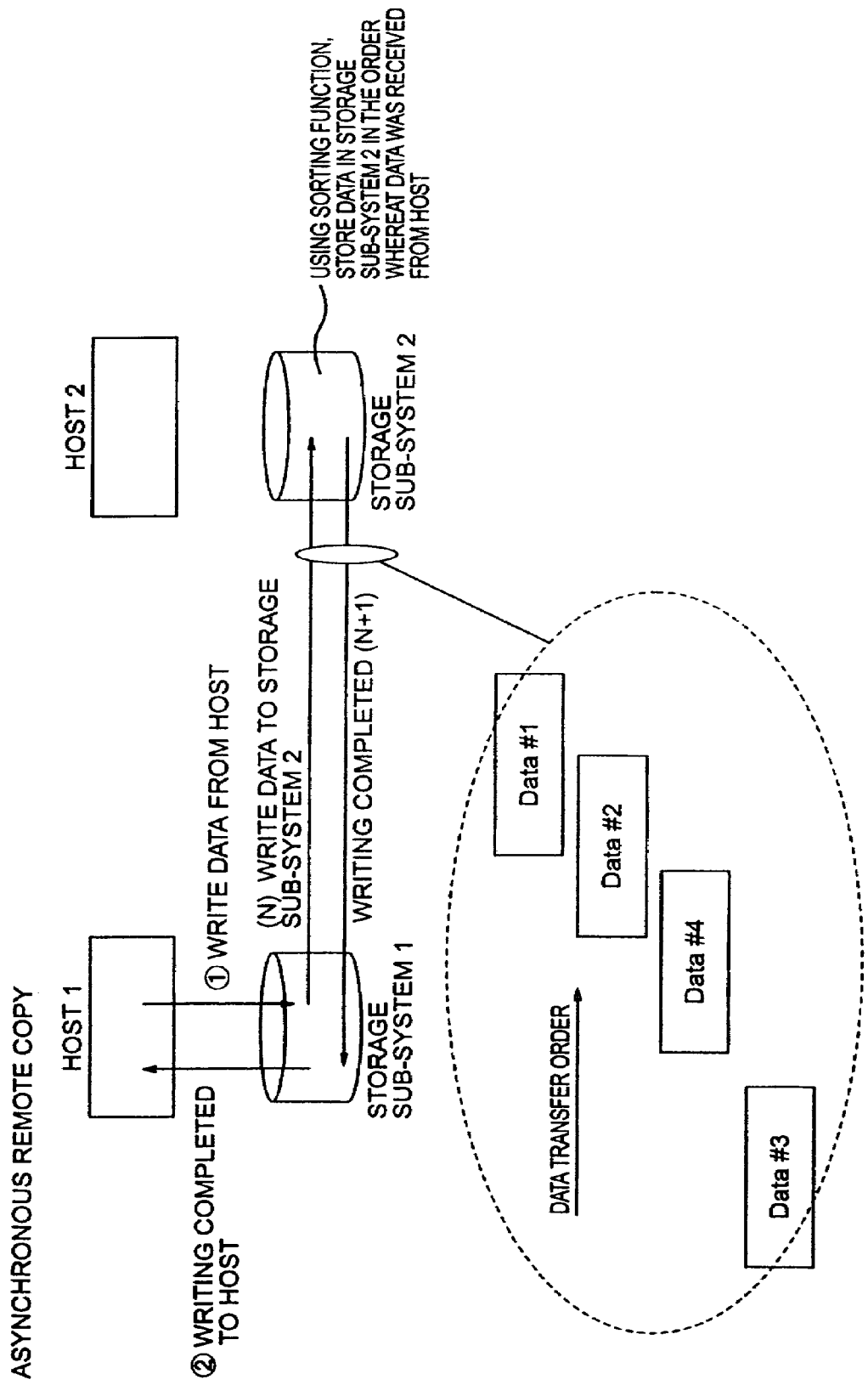
FIG. 6 is a schematic diagram for explaining the asynchronous remote copy control.

First, copying through the synchronous transfer of data or the asynchronous remote copying is defined by referring to FIGS. 5 and 6.

During the copying process performed through the synchronous transfer of data, when a host 1 issues a data update (write) instruction to a storage sub-system 1, and when the data to be written are also those that are to be written to a storage sub-system 2 that is located in the vicinity, a data update end notification is transmitted to the host after the data has been updated (written), as instructed, relative to the storage sub-system. In this embodiment, the vicinity is a so-called metropolitan network included within a 100 km range.

Specifically, for the remote copying through the synchronous transfer of data (FIG. 5), an updated data block is received from the host 1 by the storage sub-system 1 (1), and is transferred from there to a storage sub-system 2 (2). After the data block has been written, a data block write-end is received by the storage sub-system 1 (3), and finally, is transmitted to the host 1 (4). When the intermediate process fails, the occurrence of a writing blockage is reported to the host 1.

When copying through the synchronous transfer of data is performed, macroscopically the data in the near sub-system 1 connected to the host 1 constantly matches the data stored in the farther distant storage sub-system 2 located in the vicinity. Thus, even the function of one of these storage sub-systems is lost due to a disaster, the complete state immediately before the disaster occurred is held by the other storage sub-system, and the processing can be quickly resumed by the remaining systems. The fact that the data are consistently matched macroscopically indicates that during the performance of the synchronous transfer function, the data may not be matched by the unit (μsec, msec) of the processing time of a controller or an electric circuit, but at the time whereat the data updating is completed, the data is always matched. This is because the storage sub-system 1 nearer the host 1 can not complete the updating process unless the updated data is reflected to the storage sub-system in the vicinity.

In the asynchronous remote copy process (FIG. 6), when the host 1 issues a data update (write) instruction to the nearest storage sub-system connected thereto, and when the data to be written is also that which is to be written to the storage sub-system situated at a remote location, the end of the updating process is reported to the host 1 as soon as it is completed by the storage sub-system 1, and the data updating (reflecting) is performed by the storage sub-system 2 at the remote location asynchronously with the process performed by the storage sub-system 1 near the host 1.

Thus, since the data updating is terminated within the processing time required by the nearer storage sub-system 1, the host 1 is not kept waiting longer than the transfer time or the storing process time due to the storage of data in the storage sub-system 2 sited at the remote location. The remote location is a point, further distant than the vicinity, in a so-called transcontinental network, wherefor data communication or transfer is enabled without any restriction on the distance.

More specifically, in the asynchronous remote copying process, the updated data block is received from the host 1 by the storage sub-system 1 (1), and the end of the writing of the updated data block is transmitted to the host 1 (2). Further, the storage sub-system 1 transmits the data, in accordance with its own schedule, to the storage sub-system 2 asynchronously with the process performed by the host 1.

Because of the complicated data transfer path to the remote location or to the vicinity and the en route bottleneck of the data transfer path, the order of the data that is being transmitted is not guaranteed (see an elliptical block indicated by a broken line in FIG. 6).

Generally, in order to improve the data transfer performance, or in many cases, to increase the transfer speed, the data may be transmitted along multiple transfer paths by a transmission source. Further, when the destination is far distant, even when from the source only one transfer path is extended outward, the route taken to the destination is not always a single path because communication relay devices, such as a switch and a router, are located between the source and the destination. And when multiple paths are employed for the transmission of data, depending on the path taken, time differences may be generated since data may be transmitted along a fast path or a slow path, so that the order in which data arrives at the transfer destination does not always correspond with the order in which the data is transmitted by the source.

In an example enclosed by an ellipse in FIG. 6, data is transmitted along the data transfer path in the order Data#1, Data#2, Data#4 and Data#3, while at the storage sub-system 2, the data is updated in the order Data#1, Data#2, Data#3 and Data#4 because the storage sub-system 2 sorts the received data and rearranges them in the correct order. Therefore, since the data updating order is maintained even if an unexpected disaster has occurred immediately after the update processing, the database and the journal file system of the storage sub-system 2 can be recovered. On the contrary, performing the recovery process is impossible when a disaster occurs immediately before the updating process. However, when the data transmission is continuously performed between the storage sub-systems, the problem presented by the non-matching of data can be minimized, and macroscopically, the order in which data is to be updated can be obtained consistently.

In this embodiment, when the host 1 receives a data block and transmits it to the storage sub-system 2, the host 1 provides for the data sequence number information indicating the data updating order. Therefore, the storage sub-system 2 can sort the data based on the sequence number information, guarantee the order, and complete the storing of the data. After the process sequence required for the data transmission is completed, the data order is stored in the storage sub-system 2 situated at the remote location. As is described above, when the data process inherent to the asynchronous copying is continuously performed (asynchronous remote copying), the data updating order can be constantly guaranteed.

The asynchronous remote copying includes as a feature the extension of the distance between the storage sub-systems 1 and 2 without any deterioration in the performance of the host 1, and the consistent guarantee of the data order. Thus, when the user of the large area data storage system carries out his or her job, the matching of the databases or the journal file systems at a substantially arbitrary time can be obtained by the storage sub-system situated at a remote location.

<Large Area Data Storage System 1>

Figure 1:
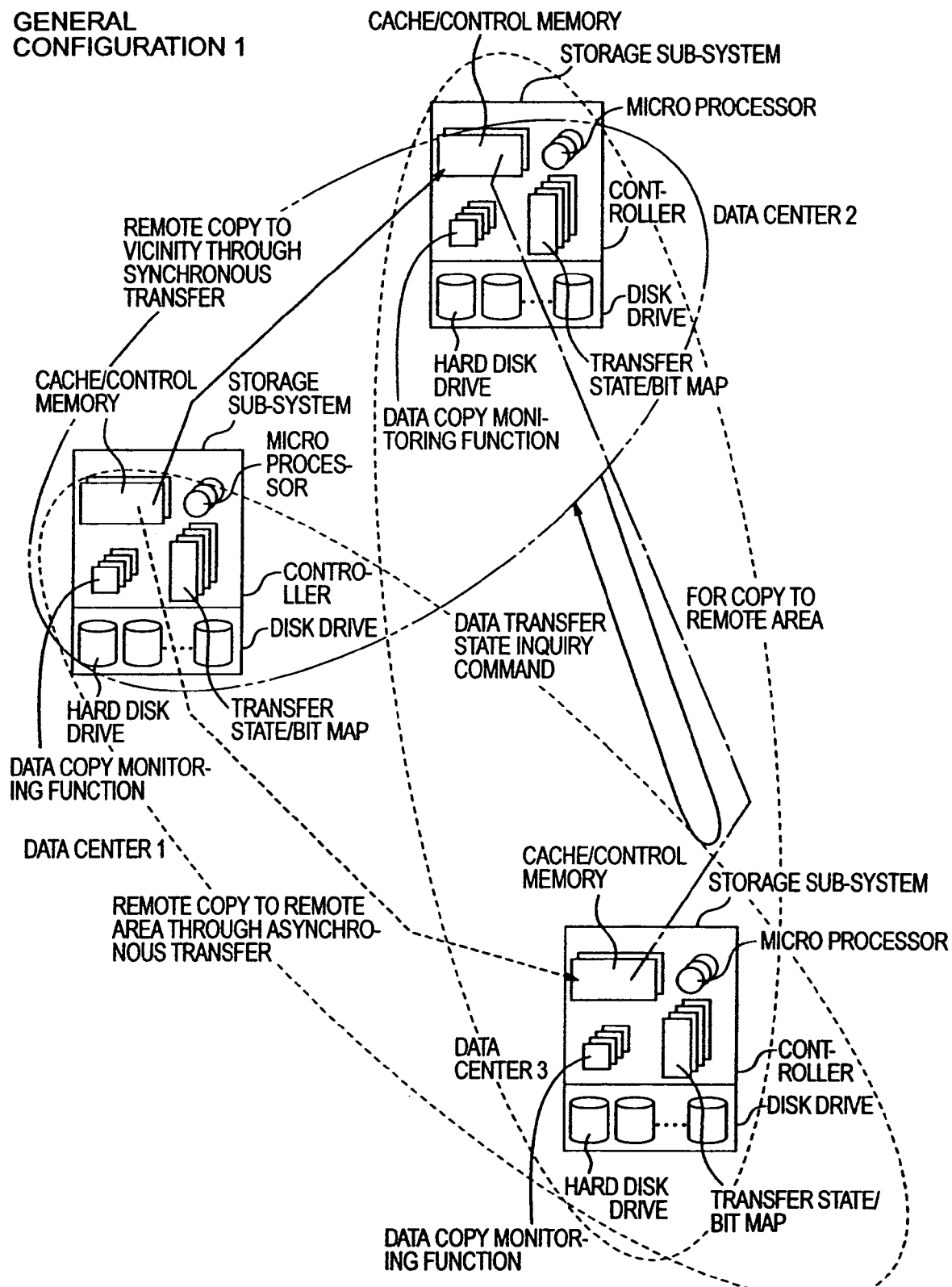
FIG. 1 is a diagram for explaining an example configuration of a large area data storage system according to the present invention.
Figure 9:
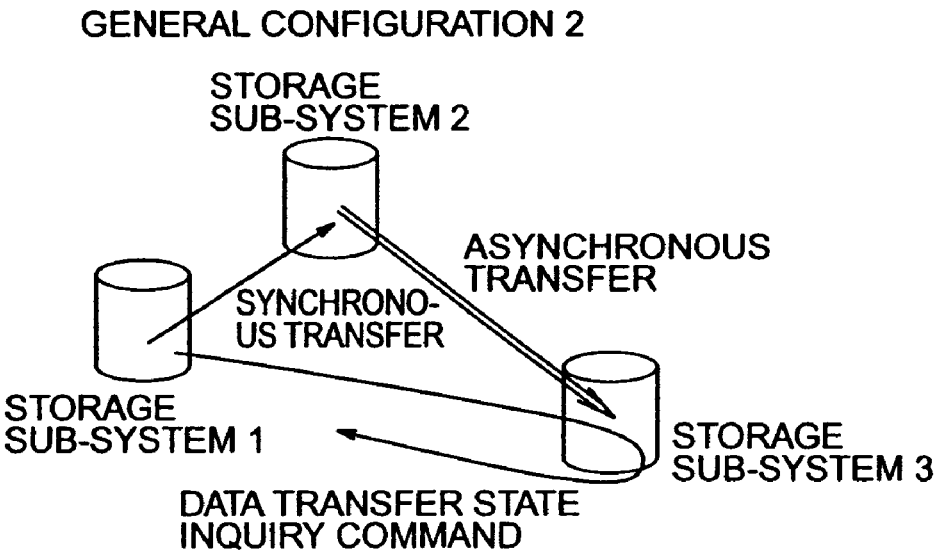
FIG. 9 is a diagram for explaining another example configuration for the large area data storage system according to the present invention.
Figure 10:
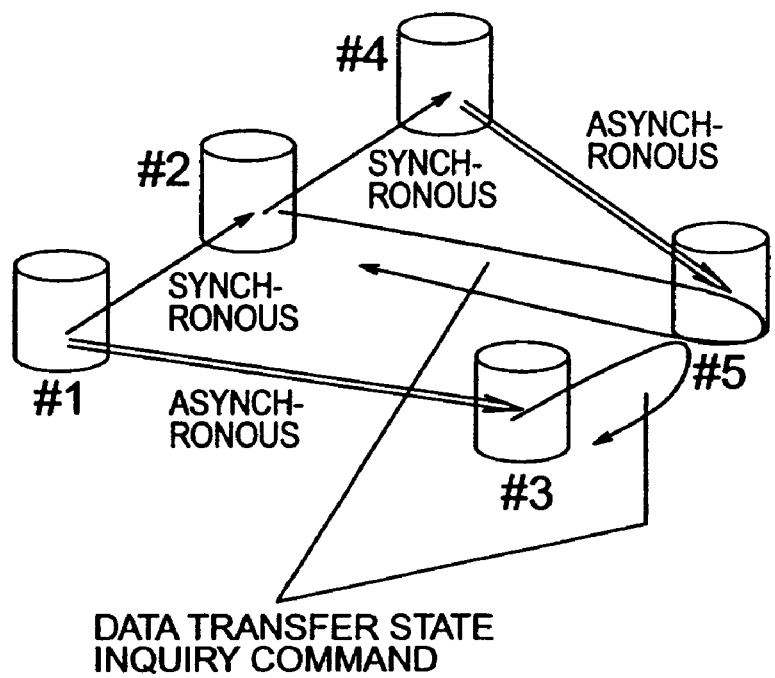
FIG. 10 is a diagram for explaining an additional example configuration for a large area data storage system according to the present invention wherein data centers are located at least four points.

FIG. 1 is a diagram showing the general configuration of a large area data storage system according to the invention. FIG. 9 is a diagram showing the general configuration of another large area storage system according to the invention. FIG. 10 is a diagram showing an example application that uses a combination of the configurations in FIGS. 1 and 9.

In FIG. 1, a storage sub-system is located in each of three data centers. Multiple storage sub-systems may be located in each data center, or multiple storage sub-systems that include a remote copy function may be connected to each data center. The application is executed by a host connected to the data center 1, and the data transfer paths between the host and the data center 1 are a fiber channel, a main frame interface, an ethernet LAN, a public line, and the Internet or another dedicated line.

The data center 1 and the data center 2 are present in the vicinity, and can exchange data through synchronous transmission. The data center 1 and the data center 3 are relatively situated at remote locations, and can exchange data through an asynchronous remote copying technique.

In the normal operating form, the updated data that the data center 1 receives from the host is stored in the storage sub-system of the data center and employed. This updated data is synchronously transmitted to the storage sub-system of the data center situated in the vicinity through a fiber channel, a main frame interface, an ethernet LAN, a public line or the Internet or another dedicated line. That is, macroscopically, the data centers 1 and 2 constantly maintain the performance of data matching between the storage sub-systems.

In the normal operating form, the updated data that the data center 1 receives from the host is transmitted to the storage sub-system of the data center situated at a remote location, along the same dedicated line while using the asynchronous remote copying technique in the same manner as the synchronous transmission of data. It should be noted that the same line need not be employed for the data centers 1 and 2 and the data centers 1 and 3, and the data transfer paths between them.

There is a long distance between the data center 1 and the data center 3, and the non-matching of the order in which updated data arrive occurs due to the transfer path between the data centers 1 and 3. Further, differential data that becomes non-reflected data at the transfer destination is present in the storage sub-system of the data center 1 at the transfer source. However, according to the asynchronous remote copy technique of the invention, since data received from the host is maintained in the order that is required for the recovery of the database and since the file system following the performance of the data process inherent to a predetermined asynchronous transfer of data is guaranteed, the order of the data for which non-matching occurs can be recovered. As a result, the order of the updated data received from the host is maintained between the storage sub-systems of the data center 1 and the data center 3.

In order to perform the recovery process, the communication line along which the data is transmitted is laid and prepared between the data center 2 and the data center 3, and the updated data from the host is not transmitted during the normal operation of the large area data storage system. Further, in order to cope with the occurrence of a disaster or a blockage at the data center 1, in the normal operation mode, an inquiry command for the data transfer process status is transmitted along the communication line from the data center 2 to the data center 3, or from the data center 3 to the data center 2. The communication lines that are laid and prepared are a fiber channel, a main frame interface, an ethernet LAN, a public line and an Internet or dedicated line.

During normal operation, to determine whether the updated data is received from the host by the asynchronous remote copying performed between the storage sub-systems 1 and 3, an inquiry is transmitted along the communication line between the data centers 2 and 3 using a "data transfer state inquiry command" issued by the storage sub-system 2.

The "data transfer state inquiry command" is activated in accordance with the schedule for the storage sub-system 2. At the timing whereat data is received from the storage sub-system 1 through synchronous transmission, this command may be issued or may be collectively issued at a predetermined time interval. The predetermined time interval may be, for example, 100 msec to 500 sec, and should be appropriate so that not too much time is spent in the management of a transfer state/bit map, which will be described later, and in the management of the differential data. Multiple bit maps may be examined upon the reception of one inquiry.

During normal operation, data is not directly exchanged by the storage sub-systems 2 and 3. Therefore, the storage sub-system 2 issues a "data transfer state inquiry command" to gain an understanding of the data updating statuses of the storage sub-systems 1 and 3.

When a blockage has occurred at the data center 1, the host of the data center 2 is employed to continue the current system operation (fail over of the host), and the differential data between the storage sub-systems 2 and 3 is transmitted by the data center 2 to the data center 3 along the communication line that is prepared to perform the recovery process. The immediate recovery of large area data storage system can be effected only by the transmission of the differential data. A fail over means a change from the primary system to the sub-system, and used also to be called a hot standby.

When the data center 2 thereafter performs the above described asynchronous remote copying for the data center 3 along the communication path, as the data center 1 has been recovered, through the synchronous transfer of data the recovery process is performed between the data center 2 and the data center 1 so that the large area data storage system existing before the blockage occurred can be recovered. It should be noted that the role of the data center 1 and the role of the data center 2 are exchanged before and after the blockage has occurred.

As is described above, the two data centers situated in the vicinity and the two data centers situated at the remote locations are unified to provide a total of three data centers, so that a large area data storage system connected by the remote copying technique can be provided. With this configuration, when a medium sized disaster or blockage has occurred, one of the data centers that are interconnected by the synchronous transfer of data can serve as a replacement for the other. Macroscopically, the data in the storage sub-systems of the two data centers are matched by the synchronous transfer of data, and the fail over can be immediately performed.

<Large Area Data Storage System 2>

Since the communication line between the data centers 2 and 3 in FIG. 1 is provided for emergency use, when instead of this communication line the data transfer path between the data centers 1 and 3 is selected after the recovery from the blockage and the disaster, the large area data storage system has the configuration shown in FIG. 9 following the recovery.

FIG. 9 is a diagram showing an example wherein the storage sub-systems 1 and 2 are connected by the synchronous transfer of data, and the storage sub-systems 2 and 3 are connected by asynchronous remote copying. In the large area data storage system in FIG. 1, the operation is changed from the data center 1 to the data center 2, and by using the data center 2 as the main operation site, the data is synchronously transmitted by the data center 2 to the data center 1 following the recovery from the blockage and the disaster, while the data is asynchronously transmitted by the data center 1 to the data center 3.

In FIG. 9, the storage sub-system 1, which is not directly concerned with the data transmission, issues the "data transfer state inquiry" command to the storage sub-system 3, and in response to this command, the data center 3 forwards the results to the data center 1. In FIG. 10, the configuration obtained by using both the arrangements in FIGS. 1 and 9 is shown. The path between the storage sub-systems 3 and 5 and the path between the storage sub-systems 2 and 5 correspond to the paths used for issuing and responding to the "data transfer state inquiry" command.

With the above described configuration of the large area data storage system, even when a large disaster occurs, or blockages have continuously occurred in the two data centers situated in the vicinity, the fail over to the host of the data center 3 is performed, so that the data being processed by the system immediately before the disaster occurred can be continuously processed and the loss of data can be minimized.

That is, when a disaster large enough to destroy two data centers in the vicinity has occurred, the storage sub-system of the data center 3 or 5 situated at a remote location (FIGS. 1, 9 and 10) can become effective. This is because the asynchronous remote copying has been performed while the order of the updated data received from the host is maintained. It should be noted that data non-reflected due to the disaster can not be recovered.

<Configuration of a Storage Sub-system>

FIGS. 1, 9 and 10 are diagrams showing the combination of the copying through the synchronous transfer of data and the asynchronous remote copying. Originally, the remote copying is obtained by coupling one logical volume with another logical volume using the data transfer technique.

According to the invention, the data received for one logical volume is transferred synchronously, and is further transmitted asynchronously to the vicinity and to the remote location by the remote copy function.

Figure 2:
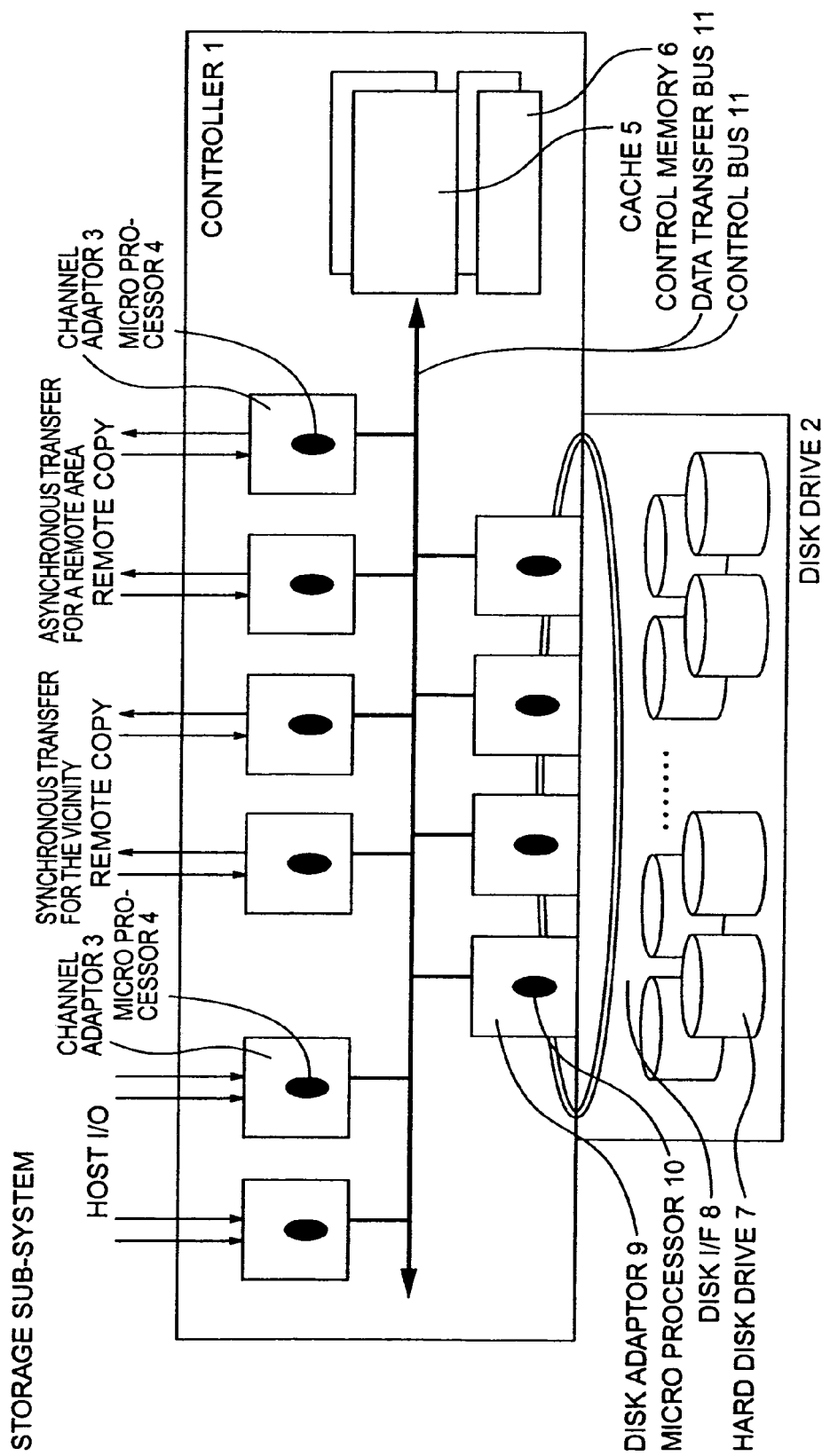
FIG. 2 is a conceptual diagram showing an example storage sub-system.

These processes are implemented by the micro code of the controller of the storage sub-system. The updated data received from the host or another storage sub-system is temporarily stored in a cache 5 (FIG. 2). At this time, the data has not yet been written by the RAID control to the hard disk drive of the storage sub-system. In the cache 5, the transfer control information is added to the updated data, the resultant data is transmitted to another storage sub-system by the remote copying technique, and the remote copying configuration using multiple storage sub-systems is implemented. When the combination of the synchronous transfer and the asynchronous transfer of data is maintained, the data centers always hold the logical volumes with which the database and the file system can be recovered, while maintaining the order for the updating of data.

FIG. 2 is a schematic diagram showing the configuration of the storage sub-system.

A controller 1 comprises a channel adaptor 3, for the exchange of data by a host and a remote copy destination; and a disk adaptor 9, for controlling a hard disk drive 7 in a disk device 2 along a disk interface (disk I/F) 8.

The channel adaptor 3 and the disk adaptor 9 each includes a microprocessor, and are connected to the cache memory 5 via a data transfer bus or control bus 11. The bus structure is only an example, and may, as needed be a cross-bar structure. Further, a plurality of controllers 1 may be provided to form a cluster structure, and a third common bus may be added to connect the controllers 1.

The cache memory 5 is used to store data that is to be exchanged with the host or with the remote copy destination. The control information, the configuration management information and the transfer state/bit map are stored in the control memory 6.

The remote copy function includes a transmission function and a reception function, and in this embodiment, the channel adaptors for receiving the I/O data from the host are separately mounted. The I/O data received from the host is temporarily stored in the cache 5. The transfer destination for the remote copying and the status management/bit map, which will be described later, are stored as control data in the control memory 6 and are controlled by the micro code.

The data stored in the cache 5 is written by the disk adaptor 9 to the hard disk drive 7 under RAID control. As a separate process, by using the micro code the data is transmitted to the remote copy destination that is defined in advance.

For example, the data received from the host is defined as the target for the succeeding remote copy process, data transmission by asynchronous transfer is defined, and the sequence number is provided for the data in the cache 5 in the order of the reception of data. The sequence number is also ID information indicating the data updating has been performed. The data is transmitted with the sequence number by the remote copy transmission function of the channel adaptor 3.

As another example, when the remote copying control is defined whereby the updated block received from the host is connected to multiple logical volumes, the data inside the cache memory 5 is processed for synchronous transfer and also for asynchronous transfer, and the resultant data, together with the sequence number, is transmitted by the channel adaptor 3 to the vicinity or to the remote location.

The example in FIG. 2 implements the present invention, and the present invention does not depend on the hardware configuration. This is because when the remote copying connection can be established between the storage sub-systems, the present invention can be carried out by the logical support and the micro code control using the micro processor.

<Transfer State/Bit Map>

FIG. 4 is a diagram showing an example table for the transfer state/bit map (hereinafter referred to as a bit map, as needed). This table is prepared inside the storage sub-systems located in two data centers that do not directly perform data transmission in order to understand the data updating state of a partner (a storage sub-system placed in another data center) that will be paired at the time of the recovery from a disaster or a blockage. For example, in FIG. 1, the data centers 1 and 3 are paired to cope with an emergency. And in the large area data storage system in FIG. 9, the storage sub-systems 1 and 3 are paired, or in FIG. 10, the storage sub-systems 2 and 5 and the storage sub-systems 3 and 5 are respectively paired to cope with an emergency.

The transfer state/bit map is required for the paired logical volumes, and in this invention, at least two transfer states/bit maps can be obtained for one logical volume. In accordance with a pair of storage sub-systems and the definition of an assumption by the paired logical volumes, each bit map is employed to manage a difference with the logical volume of a partner. The block number in the bit map corresponds to a block that is the minimum unit for managing the update of the logical volume.

The host I/O need not be the same unit as the block number. The unit of the host I/O is normally 512 bytes, at the minimum, and an upper limit is also set; however, these are variable. The bit map is slightly smaller than 50 kB or around 700 kB; however, it can have various sizes ranging from 20 kB to 1000 kB. One bit map does not always correspond to one block of the host I/O data.

When the contents of the block corresponding to the block number are updated, differential management is conducted for all the data for the pertinent block number, and at the time of synchronization (resync), all the data for the block number is transmitted.

For each block number, the bit map is used as the unit for which the logical volume is updated. And "Update" information to be transmitted to another logical volume is waited for, so that only the updated block need be transmitted in order to reconstruct (re-synchronize) the pair of logical volumes used for remote copy. In other words, when the Update flag is On (1 in the embodiment in FIG. 4), it means that the pertinent data is the transmission target. And once a normal Update is performed by the command unit of the host, the Update flag is set to 0, based on the counter value of 0.

The bit map has a further counter value whereat updates repeated multiple times are recorded using the same block number. The counter value is 0 for no update, or is 3 when the updating was repeated three times. When the size of a data block represented by a block number is larger than a data block updated by the host, the counter value is employed so that only the updated data can be transmitted to the logical volume partner.

A data copy monitoring function, which will be described later, compares the block number and the counter value that are stored in the "data transfer state inquiry command", which will also be described later, with the block number and the counter value of the bit map for the storage sub-system at the inquiry destination. In this comparison, when the counter value stored in a specific storage sub-system is equal to or greater than the counter value included in the "data transfer state inquiry command", that value is transmitted to the specific storage sub-system and the counter value of the bit map of the predetermined storage sub-system is decremented by one.

When the counter value held in the specific storage sub-system is smaller than the counter value included in the received "data transfer state inquiry command", the counter value of the bit map of this storage sub-system is unchanged. Whether or not the counter value is decremented is transmitted in response to the "data transfer state inquiry command".

When the counter value of the bit map of the storage sub-system is "equal to or greater than" the counter value included in the received "data transfer state inquiry command", the data updating status indicates that the data have already been stored in or written to the pertinent storage sub-system by the normal remote copying function. When the counter value of the bit map is "less than" the counter value included in the "data transfer state inquiry command", it means that data has not yet been received.

The counter value in FIG. 4 is finite, and when, for example, one byte is allocated as the counter value, the management process can not be performed more than 256 times. In this example, when the same block has been updated over 256 times, the counter value is not incremented any longer, and the Update flag is set permanently. That is, in FIG. 4, the information representing "Over Flow" is stored in the counter value.

Once this permanent setup is performed (Over Flow in FIG. 4), the release (entering a value of 0) of the Update flag of the block, which is specified in the bit map and which is permanently set, is not performed until the storage sub-system having this bit map acknowledges that the data transmission to the partner logical volume has been completed and the copy is established.

The reason for the updating and the management using the counter value will now be explained.

When, for example, the bit map is to be managed in correlation with a track having a data capacity of about 50 kB, assume that three different portions of the data of 50 kB are updated at different times. The bit map is managed in correlation with the track because the recovery (re-synchronization) from a disaster or a blockage is performed by using the track unit.

When the bit map is not managed by using the counter value, only the Update flag is monitored. Even when it is determined at a specific time that the Update flag is 1, if at the following time the data is updated the second or the third time, the second and the following data updates are missed. Since a new concept for the counter value is introduced and the updating of the same data block using the command unit received from the host is precisely monitored, the above described inconvenience can be avoided.

An explanation will now be given for the definition of the transfer state/bit map function implemented inside the controller 1 in FIG. 2 using the micro code. The logical volume holds the following transfer states with the logical volume that is paired for the remote copy. These states do not depend on the synchronous transfer or the asynchronous transfer.

1) The "normal pair state" is the state wherein the two overlapping volumes hold the same data while guaranteeing the data order.

2) The "transfer suppression bit map registration state" is the state wherein the data updating has not yet been registered in the bit map. It should be noted that the data has not yet been transferred to the paired volume.

3) The "copy state using a bit map" means the time whereat the "transfer suppression bit map registration state" is shifted to the "normal pair state". This state corresponds to the initial state for double copying.

4) The "interrupted state" is the state wherein data can not be transmitted due to a blockage. This state is registered in the bit map.

5) The "no-pair bit map registration state" is a special state inherent to the present invention. This state occurs from the need whereat the data updating state must be monitored and held by the two volumes before a disaster or a blockage occurs.

6) The "no pair state" is the state wherein, while a bit map is prepared, the logical volumes have not yet been paired, and no information for data updating is registered.

The presence of the "no-pair bit map registration state" is the feature of the present invention. As the proxy for this state, the suspended state, "transfer suppression bit map registration state", may be employed. The suspended state is the state wherein the state of updating data in the logical volume is managed only by the bit map, and the transfer using the remote copy is not performed.

Figure 3:
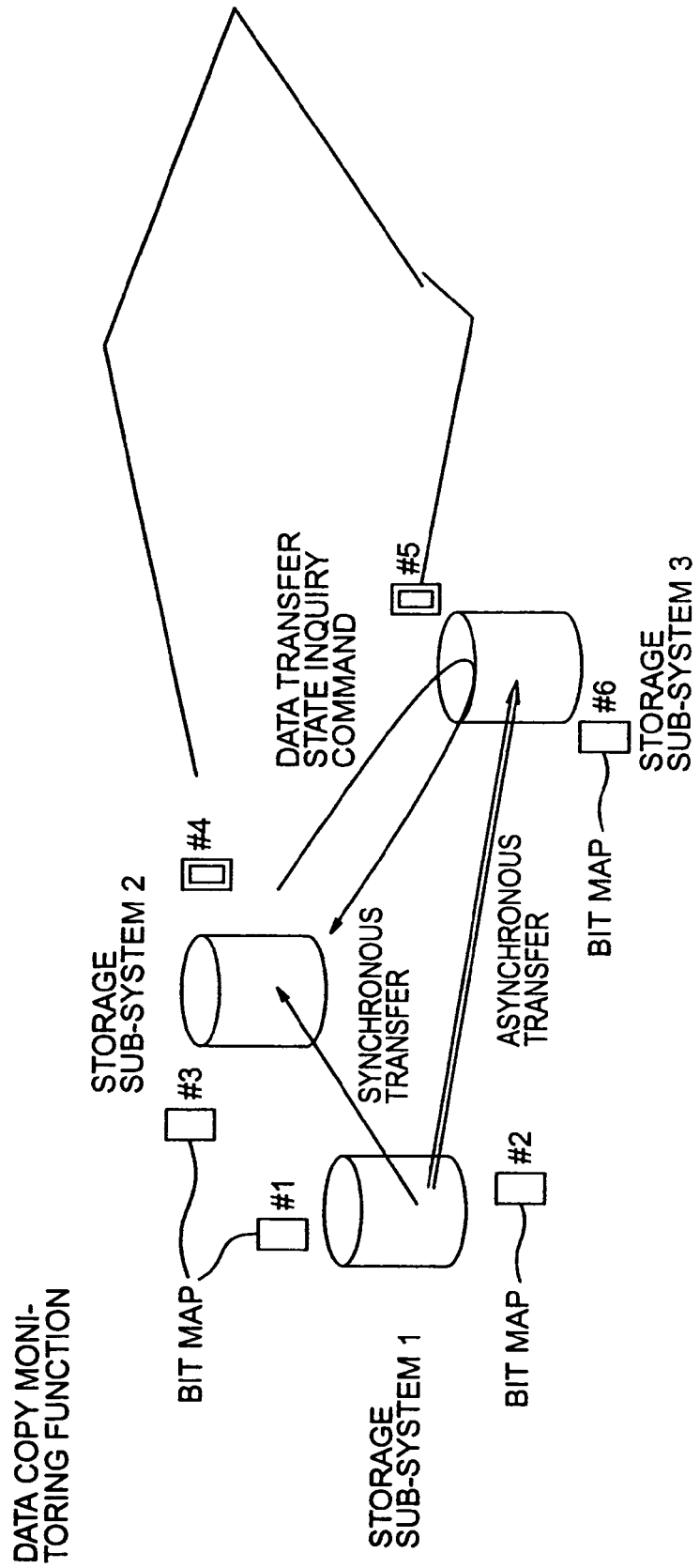
FIG. 3 is a conceptual diagram for explaining the data copy monitoring function in the configuration in FIG. 1.

In this embodiment, the "no-pair bit map registration state" is provided because the transfer state/bit map must be held by the pair (FIG. 3). For example, the following reason is applied for the large area data storage system in FIG. 1.

In order to monitor the data held by the data center 3, the data update state of the data center 3 must be included in the transfer state/bit map that is provided in accordance with the logical volume of the storage sub-system of the data center 2. Further, in order to monitor the data held by the data center 2, the data update state of the data center 2 must be included in the transfer state/bit map that is provided in accordance with the logical volume of the storage sub-system of the data center 3.

In the large area data storage system in FIG. 9, in order to cope with the occurrence of a blockage in the data center 2, based on the difference in the management information for the remote copy between the data centers 1 and 3, the data centers 1 and 3 must hold the "no-pair bit map registration state" in order to establish a pair between them. As a result, when a blockage occurs in a storage sub-system or along a data transfer path, the current state can be obtained, the non-transmitted data block can be stored by using the bit map, and the differential transfer of only the updated portion can be performed after the blockage is removed.

The transfer state/bit map function is implemented by the micro code that carries out the above described control and a control table that is related to the bit map. The specific function is performed by the micro code, for example, of the micro processor 4 in FIG. 2 and the control memory 6, and as was previously described, this function can be freely mounted by the control provided by the micro code. For example, the transfer state/bit map function can be implemented by the micro processor 10, or can be carried out by the controller having only one micro processor.

<Operation of a Large Area Data Storage System>

Figure 8:
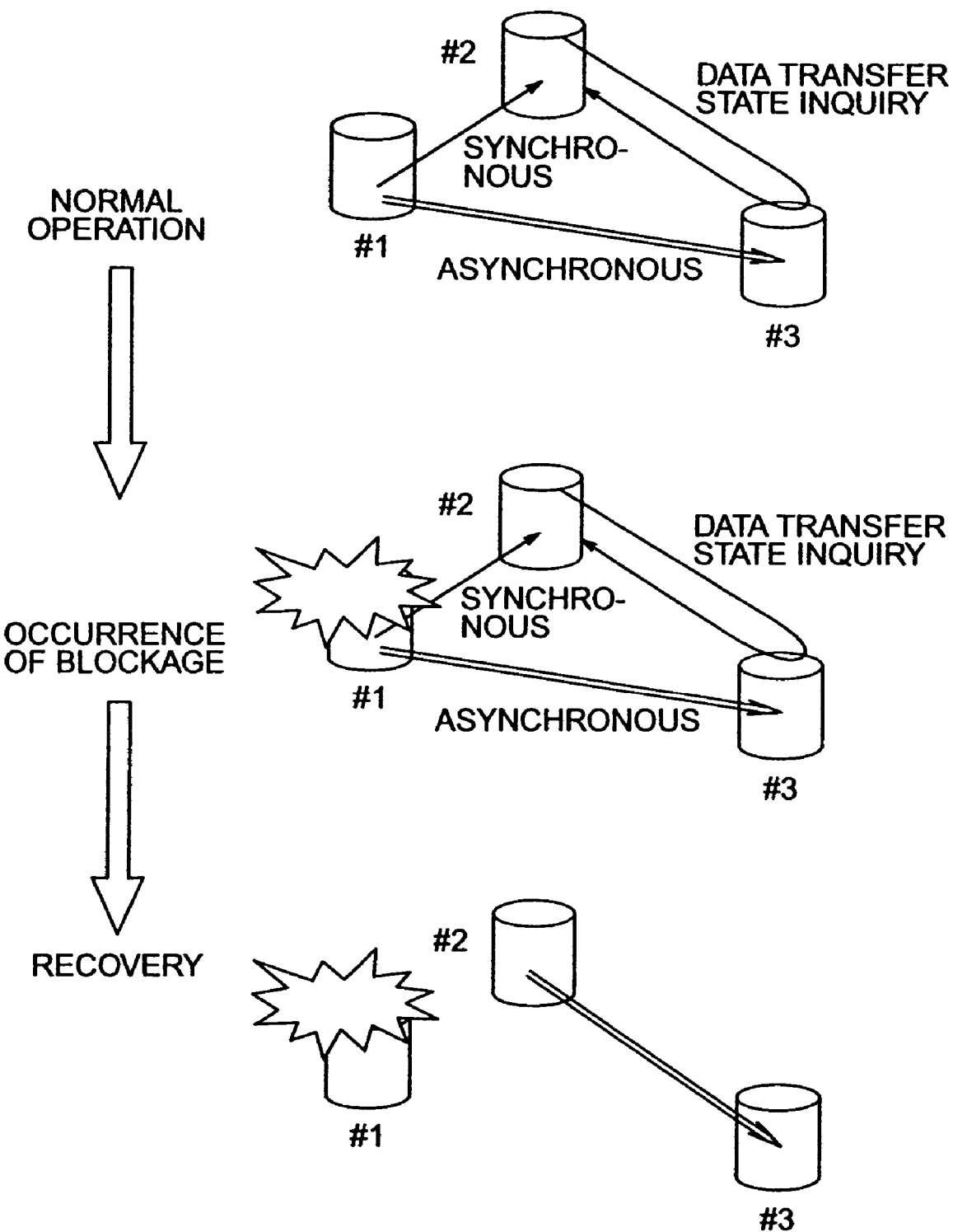
FIG. 8 is a diagram for explaining the recovery state of the entire configuration in FIG. 1 when a blockage and a disaster occurs at a data center 1.

FIG. 3 is a schematic diagram for explaining the basic control method employed when the large area data storage system in FIG. 1 is operated normally. During the normal operation, the "data transfer state inquiry command" is transmitted by the storage sub-system 2 to the storage sub-system 3. For example, upon the occurrence of a blockage in the storage sub-system 1, in order to transfer the actual differential data, the storage sub-systems 2 and 3 employ the transfer state/bit map function to perform a logical calculation for the bit maps of the two storage sub-systems. Based on the results, the storage sub-system 2 transmits only the pertinent data block to the storage sub-system 3. FIG. 8 is a schematic diagram showing the processing performed for resuming the asynchronous remote copying when a blockage or a disaster has occurred in the data center 1 of the large data storage system in FIG. 1.

In FIG. 8, during normal operation, the data is doubled by synchronous transmission from the data center 1 to the data center 2 nearby, and the data is copied to the data center 3 at the remote location by asynchronous transmission, while maintaining the data updating order. In accordance with the schedule of the storage sub-system 2 of the data center 2, the data transfer state inquiry command is issued to the data center 3, and the data centers 2 and 3 exchange the management information to manage the difference in the data.

When a disaster or a blockage has occurred in the data center 1, the storage sub-system of the data center 2 transmits differential data to the data center 3 using asynchronous transfer, and the system operation performed between the data center 2 and the remote data center 3 can be immediately recovered.

In FIG. 3, two transfer states/bit maps are held by one logical volume, and each volume has functions that use these bit maps. Relative to the storage sub-systems 2 and 3, the storage sub-system 1 has a function corresponding to transfer state/bit map #1 and a function corresponding to transfer state/bit map #2.

For a synchronous transfer and an asynchronous transfer, the storage sub-systems 2 and 3 have the functions of transfer state/bit map #3 and #6. During normal operation, the functions #1 and #3, and #2 and #6, hold the "normal pair state".

The functions of the transfer state/bit map #4 and #5 are provided for the storage sub-systems 2 and 3. When the large data storage system is normally operated, the functions of transfer state/bit map #4 and #5 hold the "no-pair bit map registration state".

The function of transfer state/bit map #4 performs differential management relative to the logical volume of the storage sub-system 3, and the function of transfer state/bit map #5 performs differential management relative to the logical volume of the storage sub-system 2.

In a configuration extended from that in FIG. 10, when the controller 1 of the storage sub-system is installed in the first data to receive the I/O from the host, and includes N copy destinations through synchronous transfer and M destinations through asynchronous remote copying, the controller 1 includes N+M transfer state/bit map functions. Accordingly, a corresponding storage sub-system (copy destination) in the vicinity or a remote location also includes a transfer state/bit map function. As a result, even when a blockage has occurred in the controller 1 or along the data transfer path, the current state can be obtained, non-transmitted data blocks can be stored using the bit map, and the differential transmission for only the updated portion can be preformed when the blockage is removed.

<Data Copy Monitoring Function>

The data copy monitoring function will now be described. This function includes a bit map control function, a remote copy status management function, a configuration management function, a data transfer state inquiry command control function, and a remote copy data transfer instruction function.

The controller of the storage sub-system 2 in FIG. 3 receives through synchronous transfer a data block from the storage sub-system 1. The data is stored in the cache memory of the storage sub-system 2, and is also recorded by the disk drive. At this time, the pertinent data block is registered in the bit map in FIG. 4 by transfer state/bit map function #4.

The "data transfer state inquiry command" including the block number and the counter value is issued to the storage sub-system 3 by the storage sub-system 2. This command may be issued based on the synchronous transfer of data, or in accordance with the unique schedule of the storage sub-system 2.

The controller of the storage sub-system 3 receives the "data transfer state inquiry command" from the storage sub-system 2, and extracts the block number and the counter value for the transfer state/bit map, and compares them with the block number and the counter value for the transfer state/bit map #5 of the storage sub-system 3.

When the block number of the transfer state/bit map #5 indicates an Update flag of 1 (update), and the counter value is equal to or greater than the received counter value, it is assumed that the data concerning the synchronous transfer matches the data concerning the asynchronous remote copying, and the counter value is incremented by 1 based on the corresponding block number of the transfer state/bit map #6. When the resultant counter value is "0", the Update flag is set to "0". And when the counter value is "Over Flow", no further process is performed.

Furthermore, when the counter value registered at transfer state/bit map #5 is less than the counter value extracted from the inquiry command received from the storage sub-system 2, or when the Update flag is "0" (Off) and no update is performed, the updating to #5 is not performed, and this state is transmitted to the storage sub-system 2 as the response for the data transfer state inquiry command.

When the transfer state/bit map function #5 decrements the counter value of the transfer state/bit map function #6, this means that the data block that has been transmitted by the storage sub-system 1 to the storage sub-system 2 using a synchronous transfer has also been transmitted by the storage sub-system 1 to the storage sub-system 3 using an asynchronous transfer.

The data copy monitoring function employs the response results to control the transfer state/bit map function of the storage sub-system 2. When the storage sub-system 3 transmits a response indicating that the block number and the counter value included in the "data transfer state inquiry command" have already been registered (i.e., when the counter value can be decremented), similarly, the controller of the storage sub-system 2 employs the transfer state/bit map function to decrement the counter value and to set the Update flag.

When the response to the command indicates that the data has not yet been registered, it is assumed that the asynchronous transfer by the storage sub-system 1 to the storage sub-system 3 is incomplete, and transfer state/bit map function #4 of the storage sub-system 2 holds the updated state in its own bit map. This state is referred to when only the updated differential portion is re-synchronized later.

At this time, when a critical blockage has occurred in the storage sub-system 1 and when the remote copying configuration must be reconstructed (re-synchronized) between the storage sub-systems 2 and 3, only the non-transmitted data, i.e., only the differential data block, need be transmitted by the storage sub-system 2 to the storage sub-system 3 by referring to the bit map. As a result, a "normal pair" can be immediately constructed merely by the transfer of the differential data. The function for implementing this process is called the "data copy monitoring function".

<Difference Management Method 1 Performed Between Storage Sub-systems that in a Normal Operation do not Directly Exchange Data>

When a blockage has occurred in the storage sub-system 2 of the large area storage system in FIG. 9, assume that the system operation has recovered by performing the asynchronous remote copying between the storage sub-systems 1 and 2.

The controller 1 (FIG. 2) of the storage sub-system 1 that receives a data updating instruction from the host performs the following processing before the data is transmitted, through synchronous copy, to the logical volume of the controller 1 of the storage sub-system 2.

The position information of a block to be transmitted is stored, as update information for the logical volume of the storage sub-system 3, in the bit map present in the controller 1 of the storage sub-system 1. At this time, when the block already transmitted has been updated by the storage sub-system 3, the counter value of the bit map is incremented by one.

When the controller 1 of the storage sub-system 1 has completed the synchronous transfer to the controller 1 of the storage sub-system 2, the controller of the storage sub-system 1 issues an acknowledgement command along the communication line connecting the storage sub-systems 1 and 3 in order to ask whether the data block has been synchronously transmitted via the controller 1 of the storage sub-system 2 to the controller 1 of the storage sub-system 3.

The acknowledgement command includes, for the updated data received from the host, the block number and the counter value of the data block for the storage sub-system. Upon receiving the acknowledgement command, the controller 1 of the storage sub-system 3 determines whether the data block received along the controller 1 of the storage sub-system 2 matches the block for which the acknowledgement command inquiry was issued.

The controller 1 of the storage sub-system 3 includes not only the transfer state/bit map function relative to the logical volume of the controller 1 of the storage sub-system 2, but also a state management/bit map function relative to the logical volume of the controller 1 of the storage sub-system 1.

When the controller 1 of the storage sub-system 3 receives data from the controller 1 of the storage sub-system 2, the controller 1 of the storage sub-system 3 registers the state of the controller 1 of the storage sub-system 1 in the transfer state/bit map held in the storage sub-system 3. This bit map includes update information relative to the block position associated with the address in the logical volume, and also includes the counter value in order to manage the updating of the same block multiple times.

The block number and the counter value registered in the transfer state/bit map of the controller 1 of the storage sub-system 3 are compared with those included in the acknowledgement command issued by the controller 1 of the storage sub-system 1. When the block numbers and counter values are matched, or the registered counter value is equal to or greater than the counter value of the acknowledgement command, it is ascertained that the arrival of the data has been normally completed, and the counter value of the bit map is decremented by one using the transfer state/bit map function.

When the results received from the controller 1 of the storage sub-system 3 indicate that the data block has arrived at the storage sub-system 3 via the storage sub-system 2, the controller 1 of the storage sub-system 1, as well as the controller 1 of the storage sub-system 3, decrements the counter value by one using the transfer state/bit map function.

Since the bit map is monitored and managed in the above described manner, even when a critical blockage, such as a disaster, has occurred in the storage sub-system 2 and data can not be exchanged by neither a synchronous nor an asynchronous transfer, the asynchronous remote copy configuration can be constructed by the storage sub-system 1 to which the host issues the I/O data and the storage sub-system 3 that stores the data contents of the storage sub-system 2 using the asynchronous remote copying.

At this time, since the transfer state/bit map functions of the controllers of the storage sub-systems 1 and 3 can be employed to transmit only the differential data block without copying all the logical volume data, the asynchronous remote copying configuration can be immediately constructed.

<Difference Management Method 2 Performed Between Storage Sub-systems that in a Normal Operation do not Directly Exchange Data>

In the large area data storage system in FIG. 1, the transfer state/bit map function is prepared for each logical volume, in order to manage the data updating states of the paired logical volumes, i.e., the storage sub-systems 1 and 2 and the storage sub-systems 1 and 3.

When a blockage has occurred in the controller 1 of the storage sub-system 1, and neither the copying using a synchronous transfer nor the asynchronous remote copying can be continued any longer, first, the controllers 1 of the storage sub-systems 2 and 3 copy the differential data to match the two data sets. Then, the asynchronous remote copying is established between the storage sub-systems 2 and 3.

The controller 1 of the storage sub-system 1, which has received from the host data to be updated, uses a synchronous transfer to transmit a data block to the controller 1 of the storage sub-system 2. Upon receiving the data block, the controller 1 of the storage sub-system 2 stores the position information (block number) of the received data block in its own transfer state/bit map in order to compare the received data with the management information for the logical volume dominated by the controller 1 of the storage sub-system 3. The transfer state/bit map function increments the counter value by one when the received data block is updated, and the data block updating performed multiple times can be recorded.

After the controller 1 of the storage sub-system 2 has registered predetermined management information in the transfer state/bit map, along the data transfer path connecting the controller 1 of the storage sub-system 2 to the controller 1 of the storage sub-system 3, the controller 1 of the storage sub-system 2 issues, to the controller 1 of the storage sub-system 3, an acknowledgement command asking whether the data block has arrived at the storage sub-system 3.

The acknowledgement command includes a block number, which is position information for a data block that the controller 1 of the storage sub-system 2 has received from the storage sub-system 1 through the synchronous transfer, and a counter value, which indicates the times at which the data block was updated.

The controller 1 of the storage sub-system 3 employs its own transfer state/bit map function to store, in the bit map, the position information (block number) and the counter value of the data block that is received from the controller 1 of the storage sub-system 1 by using the asynchronous remote copying technique, so that the block number and the counter value can be compared with the management information of the logical volume dominated by the controller 1 of the storage sub-system 2. Then, the controller 1 of the storage sub-system 3 compares the values in the bit map with the corresponding values included in the acknowledgement command.

The block number and the counter value, which are included in the acknowledgement command issued by the storage sub-system 2 to the storage sub-system 3, are compared with the management information, which the controller 1 of the storage sub-system 3 holds for the logical volume dominated by the controller 1 of the storage sub-system 2. When the counter value is equal to or greater than that included in the acknowledgement command, the counter value of the data block is decremented by one using the transfer state/bit map function.

When the decremented counter value reaches 0, it is assumed that there is no differential data between the storage sub-systems 2 and 3, and the counter value is erased from the bit map. When the comparison results are not matched, the controller 1 of the storage sub-system 3 does not operate the counter value of the bit map.

The controller 1 of the storage sub-system 3 transmits the determination results to the controller 1 of the storage sub-system 2 as a response to the acknowledgement command. When the controller 1 of the storage sub-system 2 refers to these results and decrements the counter value, it is ascertained that between the storage sub-systems 2 and 3 the same data block has been normally updated.

When a data block to be updated is not received by the storage sub-system 3, it is assumed that the data block to be updated is stored only in the storage sub-system 2. The controller 1 of the storage sub-system 2 stores this data block by using its own transfer state/bit map function.

When the controller 1 of the storage sub-system 2 receives from the controller 1 of the storage sub-system 3 a response relative to the acknowledgement command, and when the data block to be updated has not yet been transmitted to the storage sub-system 3, the counter value in the transfer state/bit map that is held by the controller 1 of the storage sub-system 2 and that corresponds to the updated state of the logical volume of the storage sub-system 3 is not decremented. This indicates that the data block for updating the bit map is differential data between the storage sub-systems 2 and 3.

When the data has arrived, the counter value of the data block for updating the transfer state/bit map is decremented by one. And when the counter value reaches 0, the storage sub-systems 2 and 3 assume that the data block concerning the updating is the same and there is no non-matching data, and do not regard the data block as the target for the copying of differential data.

As is described above, during a normal operation, since the controllers of the storage sub-systems that do not directly exchange data manage the differential data between the logical volumes while assuming a recovery from a disaster or a blockage is effected. Thus, the differential data need only be copied between the storage sub-systems, and non-matching data can be removed quickly.

<Operation of a System After Fail Over>

Figure 7:
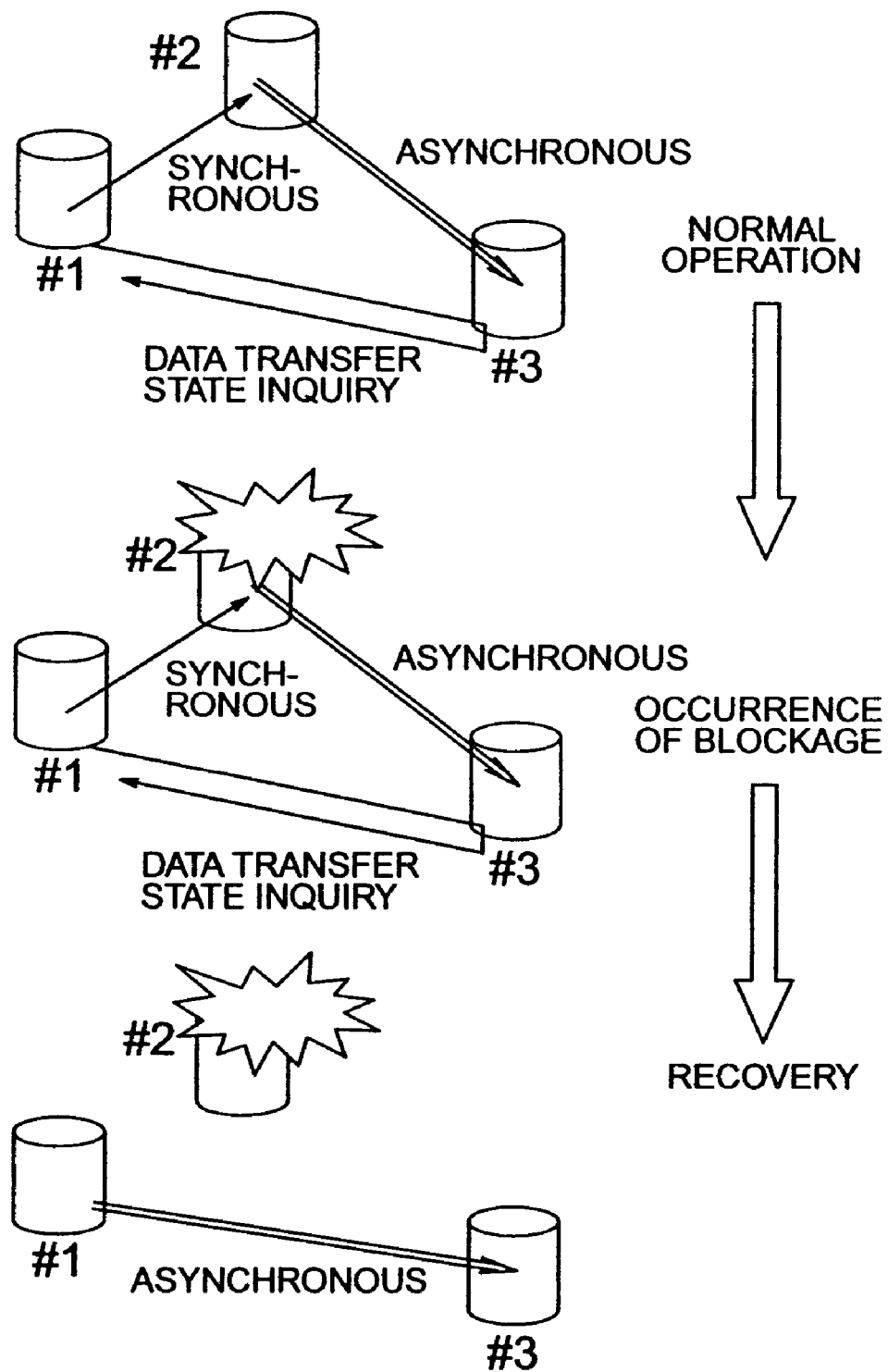
FIG. 7 is a diagram for explaining the recovery state of the entire configuration in FIG. 9 when a blockage or a disaster has occurred at a data center 2.

While referring to FIG. 7, a brief explanation will now be given for the operation when the state of the large area data storage system in FIG. 1 is shifted by fail over to a configuration in FIG. 9. When a critical blockage has occurred in the storage sub-system 1 in FIG. 3, in the storage sub-system 2 in FIG. 9, or in the storage sub-system 1, 2 or 4 in FIG. 10, as is shown in FIG. 7, recovery of the remote copy configuration is effected by the remaining two or more storage sub-systems.

According to the present invention, the differential copy need only be copied between the logical volumes (the storage sub-systems 1 and 3) that do not directly relate to the data transfer, a remote copy pair can be immediately generated, and the remote copy operation can be resumed.

If the present invention is not applied, in the configuration in FIG. 3 the storage sub-system 2 must fully copy the stored data to the storage sub-system 3, or in the configuration in FIG. 9 the storage sub-system 1 must fully copy the stored data to the storage sub-system 3, in order to provide the remote copy configuration between the storage sub-systems 2 and 3 in FIG. 3, or between the storage sub-systems 1 and 3 in FIG. 9. A large data center requires an extended period of time for copying, and delays the resumption of the remote copying. When a blockage or a disaster again occurs at a copy source or along a data transfer path during a long copy operation, the data is destroyed and lost.

Figure 11:
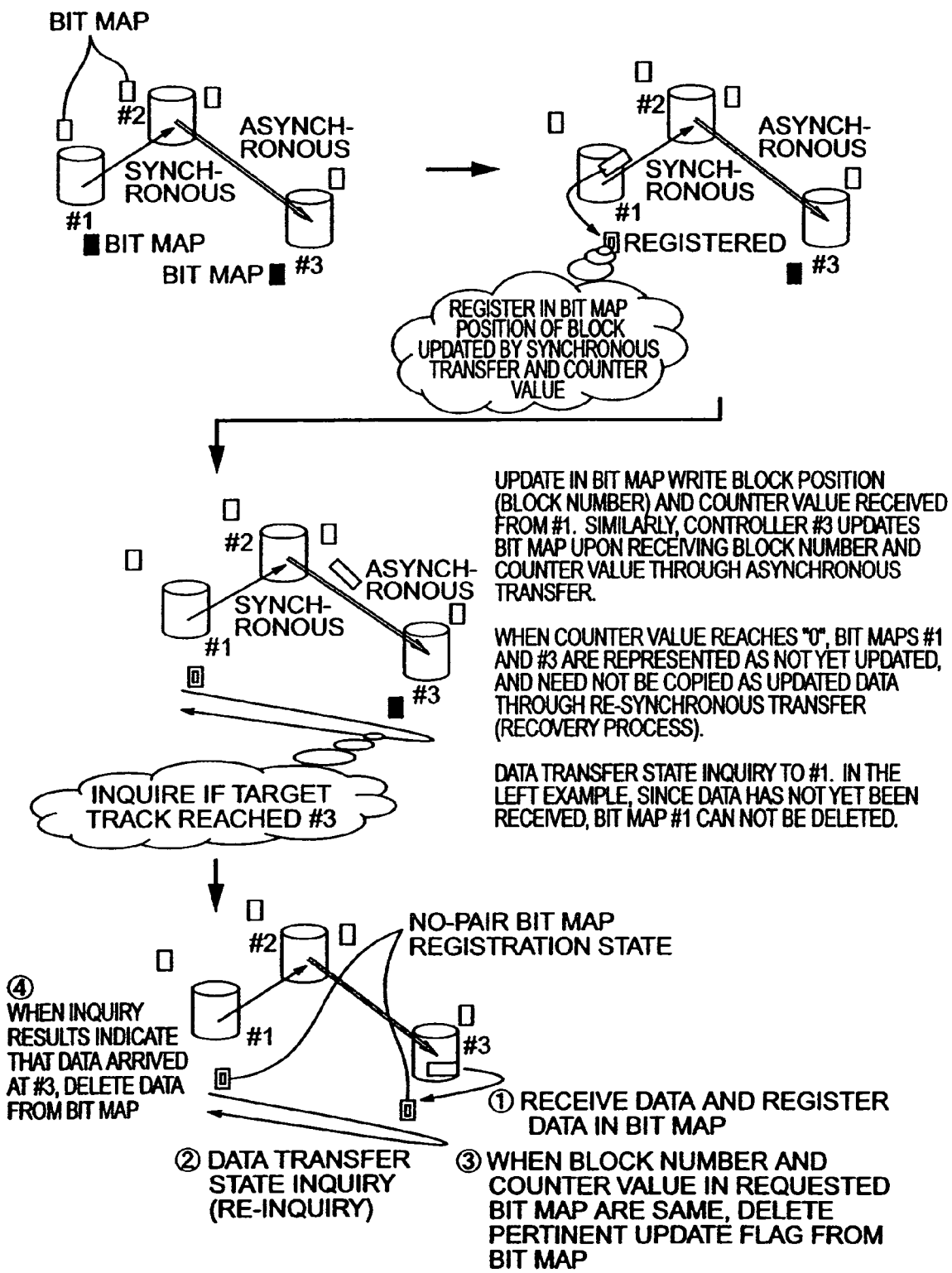
FIG. 11 is a conceptual diagram for explaining a data copy monitoring function in the overall configuration in FIG. 9.

The data copy monitoring function of the configuration in FIG. 9 will be briefly described while referring to FIG. 11.

The data transfer state inquiry command is issued by the storage sub-system 1 to the storage sub-system 3. The data copy monitoring function differs partially from that in FIG. 1. The storage sub-system 1 synchronously transmits, to the storage sub-system 1, the updated data received from the host, and permits the storage sub-system 3 to activate the "data copy monitoring function. Specifically, the storage sub-system 1 issues the "data transfer state inquiry command", and employs transfer state/bit map #1 of the storage sub-system 1 and transfer state/bit map #3 of the storage sub-system 3 to register the Update flags and the counter values and to perform a predetermined operation.

The storage sub-system 1 issues an inquiry to the storage sub-system 3 to determine whether the same data as the data (track) the storage sub-system 1 received from the host has been transmitted to the storage sub-system 3. When the data has not yet been received, the bit map for the transfer state/bit map #1 of the storage sub-system 1 is maintained unchanged. If the data has arrived, i.e., if the block number and the counter value of the bit map of the transfer state/bit map function #3 are the same, the Update flag and the bit map for the transfer state/bit map function #1 are deleted.

<Other Process for Re-synchronization>

When an error or a defect occurs in the response to the "data transfer state inquiry command" detected by the data copy monitoring function, or when a defect occurs in the transfer state/bit map function, the difference management is inhibited, which concerns the recovery process that should be performed upon the occurrence of a blockage or a disaster.

For the transfer state/bit map function, the bit map includes a storage area for an finite counter value. When the same data block is updated over the finite value (overflow), even if the redundancy is maintained later by the two or more storage sub-systems, the data block is always regarded as the update target when the re-synchronization process or the difference copy process is performed after a blockage or a disaster has occurred.

In the normal operation, when a response is not issued for a predetermined period of time relative to an inquiry (acknowledge command) that is exchanged among the storage sub-systems that do not directly transmit data, it is assumed that the time has expired and the re-synchronization process is inhibited, without performing the reconstruction of a pair of logical volumes using asynchronous remote copying, or the transmission of only differential data. This is because, since the data updated state of the logical volume to be paired can not be obtained, it is not appropriate to perform the reconstruction of the pair of logical volumes.

<Management of Matching of Data Through an Asynchronous Transfer>

Assume that the storage sub-systems 1 and 2 connected to the host are operated using asynchronous transfers whereby the data is copied from the storage sub-system 1 to the storage sub-system 2. In this case, when the data writing order for the storage sub-system 1 differs from the data writing order for the storage sub-system 2, the matching of the data for the storage sub-systems 1 and 2 is not guaranteed. The arrangement for avoiding the non-matching of data will now be described.

First, blocks of predetermined size (e.g., 16 K bytes) are defined in the storage area of the resource for each of the storage sub-systems 1 and 2, and unique block numbers are allocated to the blocks. Then, for each block for which the host has written data, the correlation of the block number and the sequence number provided in the data writing order is entered in the control memory 6. For example, when as is shown in FIG. 12 data is written to blocks having block numbers 56 to 59, the data management information in FIG. 13 is created in the control memory 6.

For an asynchronous transfer from the storage sub-system 1 to the storage sub-system 2, as is shown in the transfer data format in FIG. 14, the data management information is attached to the data to be transmitted. Then, as is shown in FIG. 15, the storage sub-system 2 manages, in the control memory 6, the data management information that is received with the data. The data management information is stored in the control memory 6, i.e., the combination of the sequence number and the block ID is stored in correlation with the position information in the cache memory of corresponding data. The storage sub-system 2 writes, to the storage resource, the data that is included in the position information in the cache memory in the order corresponding to the sequential numbers in the data management information.

As is described above, the data is written to the storage resource of the storage sub-system 2 in the order whereat the host has written the data to the storage resource of the storage sub-system 1, so that the matching of the data in the storage sub-systems 1 and 2 can be guaranteed.

<Multi-hop Method>

Figure 16A:
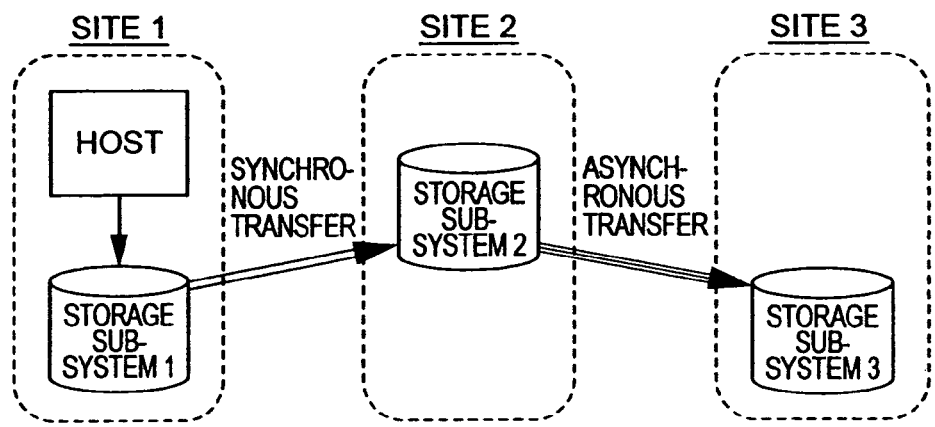
FIG. 16A is a conceptual diagram showing a large area data storage system of a multi-hop type.

A large area data storage system in FIG. 16A comprises: a storage sub-system 1 located at a site 1; a storage sub-system 2 located at a site 2; and a storage sub-system 3 located at a site 3. The storage sub-system 1 is connected to a host that employs this system 1 as storage means. The storage sub-systems 1 and 3 are interconnected by communication means.

The storage sub-systems 1 and 2 are employed for synchronous transfers whereby the data is copied from the storage sub-system 1 to the storage sub-system 2. Further, the storage sub-systems 2 and 3 are employed for asynchronous transfers whereby the data is copied from the storage sub-system 2 to the storage sub-system 3. The remote copy method in this form is thereafter called a "multi-hop method". It should be noted that with the multi-hop method either synchronous transfers or asynchronous transfers are arbitrarily set for communication among the storage sub-systems. Further, another transfer method may be employed.

Figure 16B:
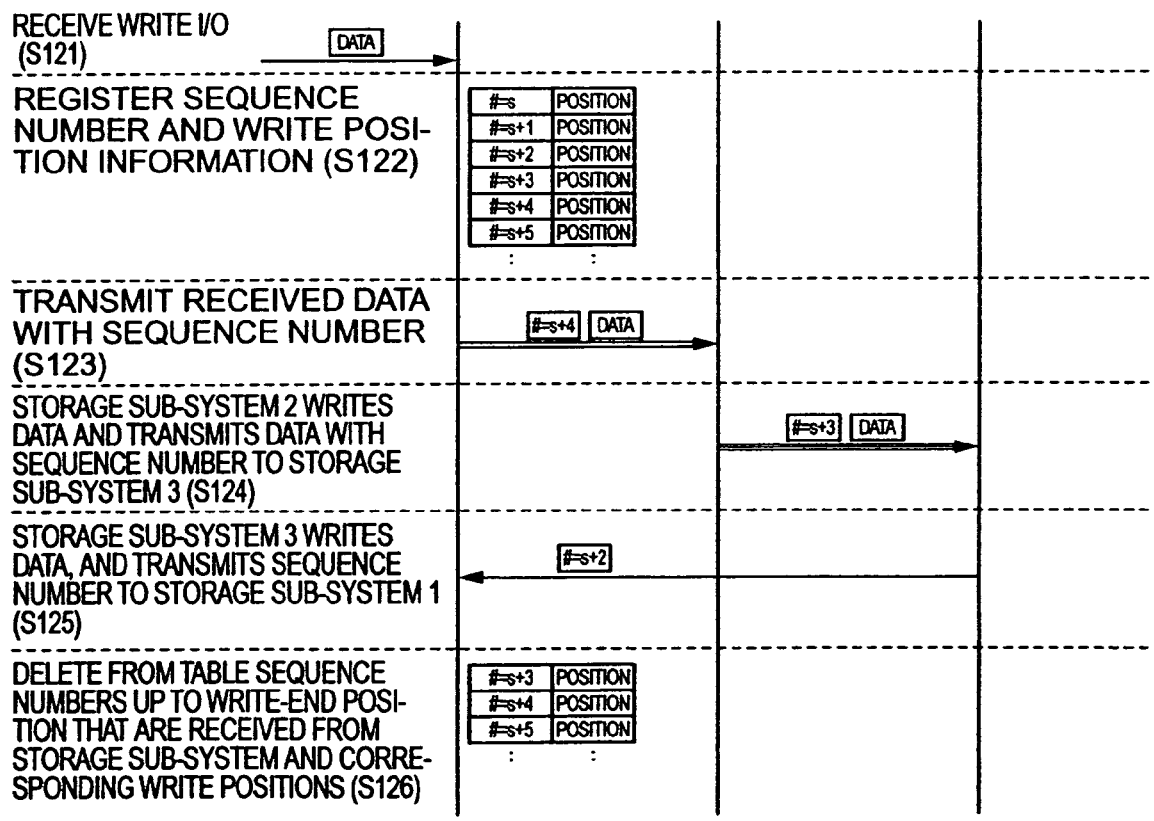
FIG. 16B is a diagram showing the flow of the processing performed by the storage sub-system in FIG. 16A.

While referring to FIG. 16B, a detailed explanation will now be given for data difference management using the multi-hop method.

The storage sub-system 1 receives, from the host, target data to be written and a writing request (Write I/O) (S121). Then, the storage sub-system 1 writes the target data in the logical volume (first storage resource), provides a sequence number in the order whereat the data writing process was performed, and stores the sequence number (in a predetermined table) in correlation with the write position information that specifies the storage location in the logical volume (first storage resource) whereat the target data is written (S122). It should be noted that the write position information is represented using a sector number or a track number.

The storage sub-system 1 transmits, to the storage sub-system 2, the target data and the sequence number provided (S123). The transmission of the data and the sequence number is performed between the storage sub-systems after the data transmission command has been issued, and as needed, the data write position information is provided for the data transmission command.

The storage sub-system 2 receives, from the storage sub-system 1, the target data to be written and the sequence number, and writes them to its own logical volume (second storage resource). When the writing is completed, the storage sub-system 2 transmits a complete notification to the storage sub-system 1.

The storage sub-system 2 transmits the target data and the sequence number to the storage sub-system 3 at an appropriate timing (S124). (In FIG. 16b, in order to express a time lag, the sequence number of the data transmitted by the storage sub-system 1 to the storage sub-system 2 differs from the sequence number of the data transmitted by the storage sub-system 2 to the storage sub-system 3).

The storage sub-system 3 receives the data and the sequence number, and transmits, to the storage sub-system 1, the sequence number that is issued in correlation with the target data to be written (S125). The storage sub-system 1 receives the sequence number from the storage sub-system 3.

The storage sub-system 1 examines the received sequence number and the correlation (table) between the stored sequence number and the corresponding write position information. Thus, the data not reflected to the logical volume (third storage resource) in the storage sub-system 3, i.e., the differential data, can be obtained. The examination is performed by deleting, from the table, the write position information and the sequence numbers up to the write complete position that is received from the storage sub-system 3 (S126).

An explanation will now be given for the recovery process when the storage sub-system 2 is halted due to a disaster.

Figure 17A:
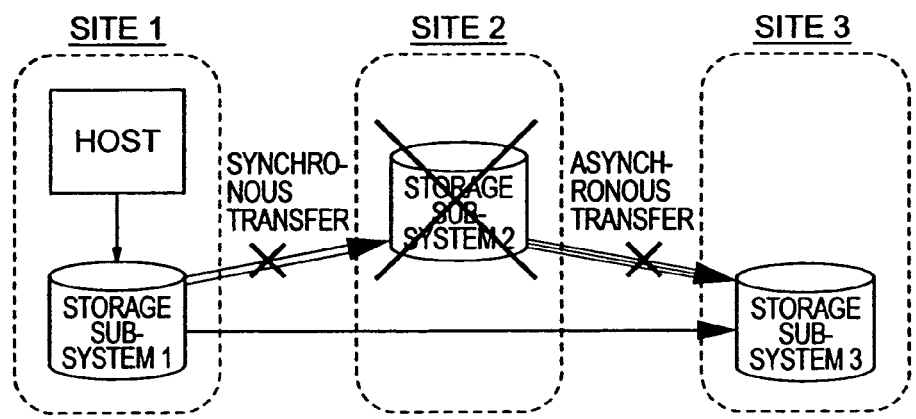
FIG. 17A is a conceptual diagram showing a large area data storage system of a multi-hop type.
Figure 17B:
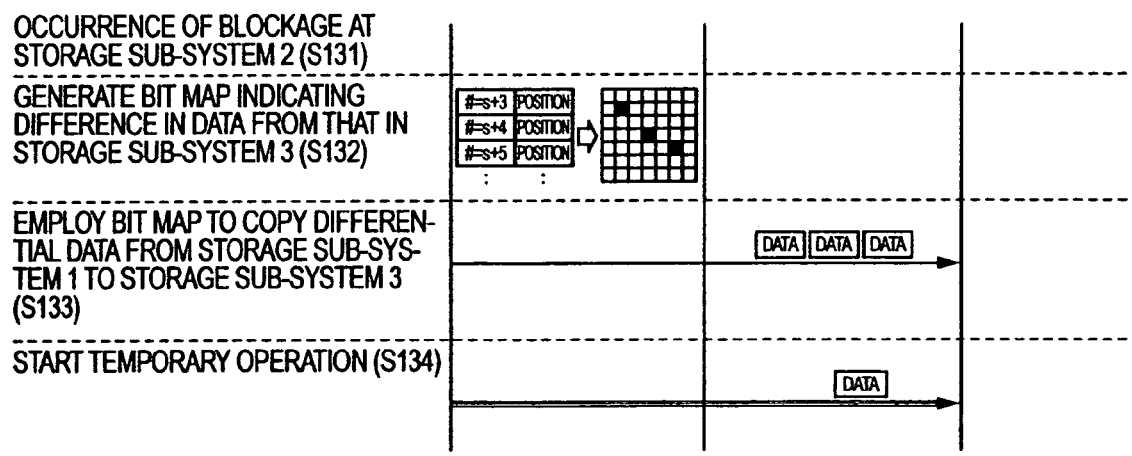
FIG. 17B is a diagram showing the flow of the processing performed by the storage sub-system in FIG. 17A.

As is shown in FIG. 17A, the storage sub-system 1 employs, for example, a disaster detection function, such as a function for monitoring a heart beat message, to monitor the operating state of the storage sub-system 2 in real time. While referring to FIGS. 17A and 17B, an explanation will now be given for the processing wherein, when the storage sub-system 1 detects, due to the interruption of a heart beat message, that a blockage has occurred in the storage sub-system 2, the contents of the storage sub-system 1 and the contents of the storage sub-system 2 are matched by copying only the differential data, and the operating state of the storage sub-systems 1 and 3 is shifted to the temporary operating state using asynchronous transfers.

When the storage sub-system 1 detects the occurrence of a blockage in the storage sub-system 2 (S131), first, the storage sub-system 1 generates a bit map in correlation with the data storage location for a predetermined block unit in the logical volume (first storage resource) of the system 1. Then, based on the correlation between the sequence number and the write location information, both of which are stored in the storage sub-system 1 as is the differential data that is not reflected to the storage sub-system 3, the storage sub-system 1 renders ON a bit at the location corresponding to the bit map for which the data is updated (S132).

Then, the differential data that is stored at the ON location in the bit map of the logical volume of the storage sub-system 1 is copied from the storage sub-system 1 to the corresponding storage location in the storage sub-system 3 (S133). When the copying is completed, the temporary operation is initiated in the form of copying the differential data from the storage sub-system 2 using asynchronous transfers (S134).

To change the operation to the temporary operation, when a blockage has occurred in the storage sub-system 2, not all the data need be copied from the storage sub-system 1 to the storage sub-system 3, and only the differential data need be copied. Therefore, when a satisfactory amount of data is not transmitted along the communication line between the storage sub-systems 1 and 3, the data stored in the logical volumes of the storage sub-systems can be easily synchronized.

Now, an explanation will be given for the process sequence performed when the storage sub-system 2 is recovered and the temporary operation is changed to the normal operation.

First, the storage sub-system 1 copies, to the logical volume (second storage resource) of the storage sub-system 2, all the data stored in the logical volume (first storage resource) of the storage sub-system 1, and initiates the operation using synchronous transfers whereby data is copied from the storage sub-system 1 to the storage sub-system 2. Specifically, when data is written to the logical volume (first storage resource) upon receiving an instruction from the host, the storage sub-system 1 transmits the written data and the sequence number to the storage sub-system 2.

Figure 18:
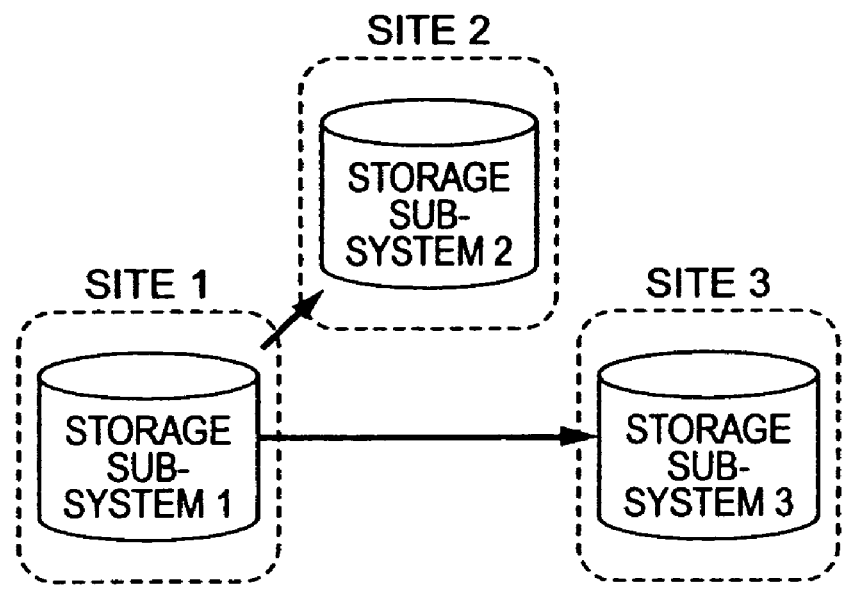
FIG. 18 is a diagram showing the state of data transmission between the storage sub-systems when the multi-hop type is being switched from temporary use to normal use.

The storage sub-system 2 writes, to the logical volume thereof (second storage resource), the data and the sequence number that are received from the storage sub-system 1. When the writing process is completed, the storage sub-system 2 stores (in a predetermined table) the write location information, which specifies the location in the logical volume (second storage resource) wherein data has been written, together with the sequence number provided in the data writing order. The data transfer state at this time is shown in FIG. 18.

Next, when the storage sub-system 3 receives the data and the sequence number from the storage sub-system 1, the storage sub-system 3 stores the data in the logical volume thereof (third storage resource) (FIG. 18), and transmits the correlated sequence number to the storage sub-system 2 (not shown).

The storage sub-system 2 receives the sequence number from the storage sub-system 3. At this time, the storage sub-system 2 examines the received sequence number and the correlation between the stored sequence number and the corresponding write position information, so that data not reflected to the logical volume of the storage sub-system 3, i.e., the differential data, can be obtained.

Then, in the temporary operation, the asynchronous transfer process for copying the data from the storage sub-system 1 to the storage sub-system 32 is halted. After this process is halted, the storage sub-system 2 generates, in the control memory thereof, a bit map that corresponds to the data storage location for a predetermined block unit of the logical volume (second storage resource). Then, based on the correlation stored in the storage sub-system 2 between the write position information and the sequence number for the differential data that is not reflected to the storage sub-system 3, the storage sub-system 2 renders ON a bit at the pertinent location of the bit map for which the data has been updated.

In addition, the storage sub-system 2 transmits, to the storage sub-system 3, the differential data, which is not reflected to the logical volume (third storage resource) of the storage sub-system 3, and the write position information, both of which are obtained from the bit map.

Figure 19:
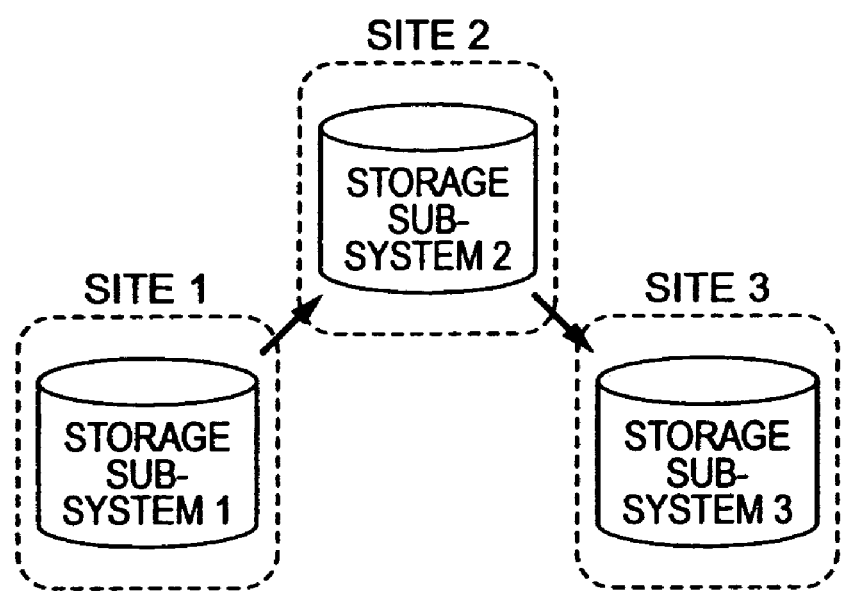
FIG. 19 is a diagram showing the state of data transmission between the storage sub-systems after the multi-hop type has been switched from temporary use to normal use.

The storage sub-system 3 receives the differential data and the write position information, and writes the differential data to the data storage location that is designated in the logical volume (third storage resource) by using the write position information. Thus, synchronization can be obtained between the contents of the logical volume (second storage resource) of the storage sub-system 2 and the contents of the logical volume (third storage resource) of the storage sub-system. After the above described process is terminated, the asynchronous transfer operation is resumed by the storage sub-systems 2 and 3 in the normal state in FIG. 19.

The shifting from the temporary operation to the normal operation is completed in this manner.

<Multi-copy Method>

Figure 20A:
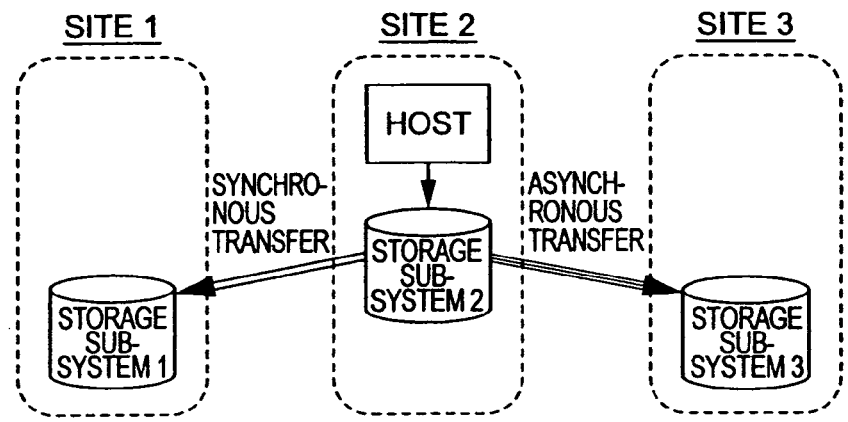
FIG. 20A is a conceptual diagram showing a large area data storage system of a multi-hop type.
Figure 20B:
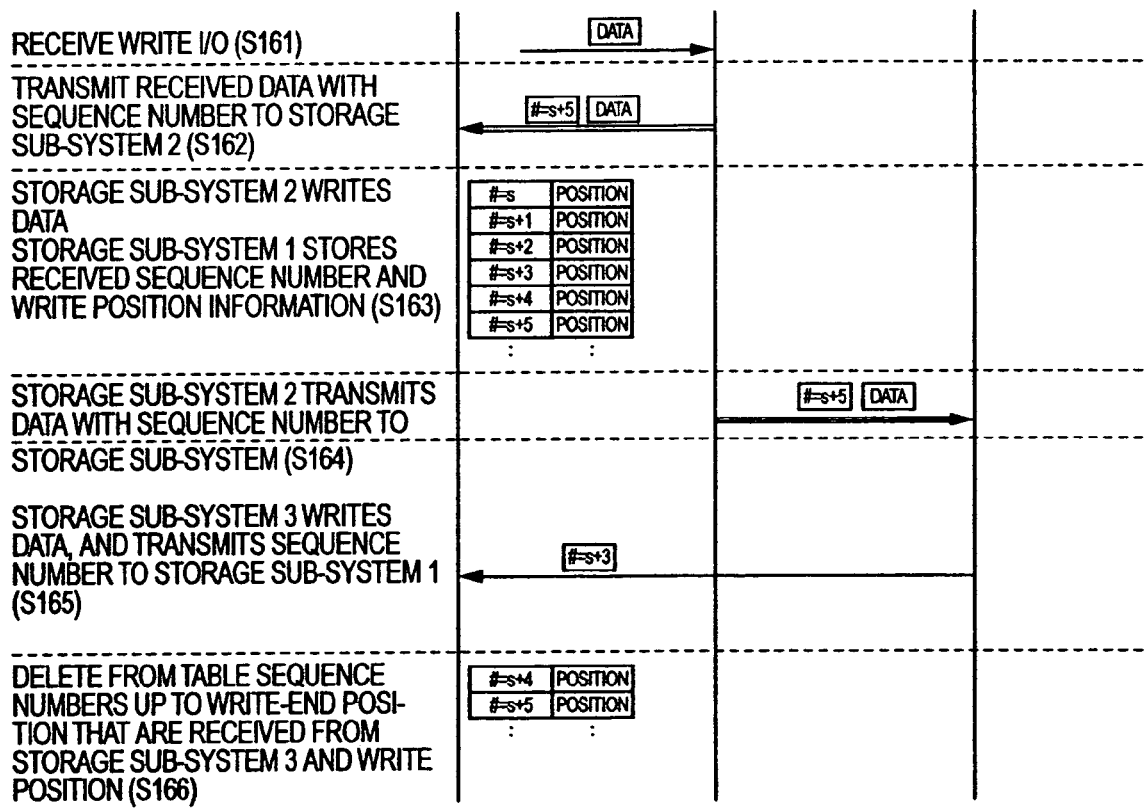
FIG. 20B is a diagram showing the flow of the processing performed by the storage sub-system in FIG. 20A.

A large area data storage system in FIG. 20 comprises: a storage sub-system 1 located at a site 1; a storage sub-system 2 located at a site 2; and a storage sub-system 3 located at a site 3. The storage sub-system 2 is connected to a host that employs the storage sub-system 2 as storage means. The storage sub-systems 1 and 3 are interconnected by communication means.

The storage sub-systems 1 and 2 are operated using synchronous transfers during which the data is copied from the storage sub-system 2 to the storage sub-system 1. The storage sub-systems 2 and 3 are operated using asynchronous transfers during which the data is copied from the storage sub-system 2 to the storage sub-system 3. Hereinafter, the remote copy method having this form is called a "multi-copy" method. It should be noted that either synchronous transfers or asynchronous transfers are arbitrarily set for the communication among the storage sub-systems when the multi-copy method is used. A transfer method other than the synchronous and the asynchronous transfer methods may be employed.

The data difference management method of the embodiment will now be described while referring to FIG. 20. The storage sub-system 2 receives, from the host, target data to be written and a write request (Write I/O) (S161), and writes the target data to the logical volume thereof (second storage resource). Further, the storage sub-system 2 transmits, to the storage sub-system 1, the written data and the sequence number that is provided in the order wherein the data are written (S162). At the same time, the written data and the sequence number that are provided are also transmitted to the storage sub-system 3 (S164). As well as for the multi-hop method, the transmission of the data and the sequence number between the storage sub-systems is performed, for example, after the data transmission command has been transmitted. Further, the previously described data write position information is attached, as needed, to the command.

The storage sub-system 1 receives the target data and the sequence number from the storage sub-system 2, and writes the target data to the logical volume thereof (first storage resource). At this time, the sequence number is stored (in a predetermined table) in correlation with the write position information that specifies the storage location in the logical volume (first storage resource) in which the data has been written (S163). The write position information is represented using, for example, a sector number or a track number.

Next, the storage sub-system 3 receives the target data and the sequence number from the storage sub-system 2, and writes the target data to the logical volume thereof (third storage resource). When the writing is completed, the storage sub-system 3 transmits, to the storage sub-system 1, the target data to be written and the sequence number that is paired with this data (S165). Thus, the storage sub-system 1 receives the sequence number from the storage sub-system 3.

The storage sub-system 1 examines the received sequence and the correlation of the stored sequence number, and the corresponding write position information, so that the data not reflected to the logical volume (third storage resource) of the storage sub-system 3, i.e., the differential data, can be obtained. This examination is performed, for example, by deleting from the table the sequence numbers up to the write-end position and the write position information that are received from the storage sub-system 3 (S166).

The normal operation using the multi-copy method is performed in the above described manner.

An explanation will now be given for the recovery process performed when the storage sub-system 2 is halted due to a disaster.

Figure 21A:
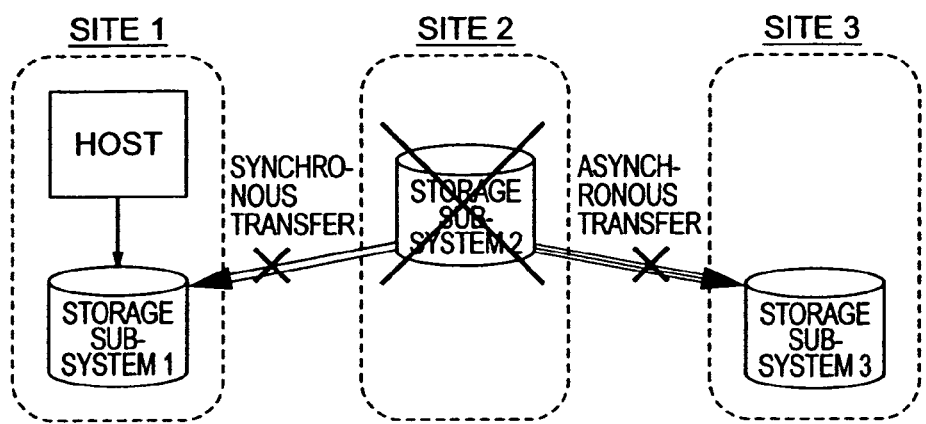
FIG. 21A is a conceptual diagram showing a large area data storage system of a multi-hop type.
Figure 21B:
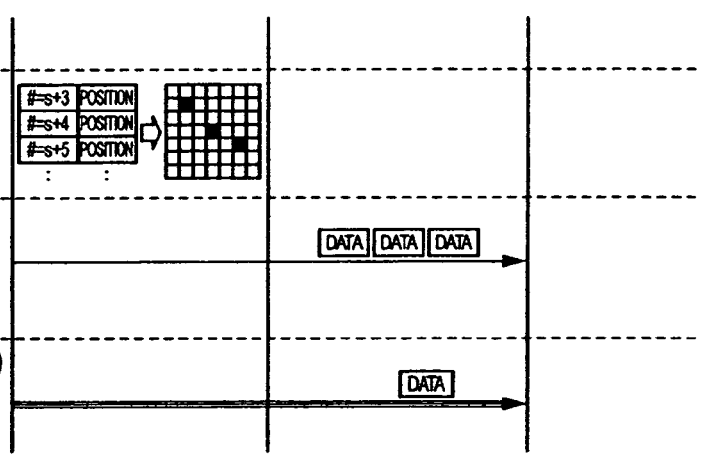
FIG. 21B is a diagram showing the flow of the processing performed by the storage sub-system in FIG. 20A.

As is shown in FIG. 21A, the storage sub-system 1 employs a blockage detection function, such as a heart beat message monitoring function, to monitor the operating state of the storage sub-system 2 in real time. An explanation will now be given, while referring to FIG. 21B, for the process wherein, when the storage sub-system 1 detects the occurrence of a blockage in the storage sub-system 2 due to the interruption of the heart beat message, instead of the host connected to the storage sub-system 2, the contents of the storage sub-system 1 are matched with the contents of the storage sub-system 3 merely by copying the differential data, and the operating mode for the storage sub-systems 1 and 3 is changed to the temporary operation using asynchronous transfers.

When the storage sub-system 1 has detected the occurrence of a blockage in the storage sub-system 2 (S171), upon, for example, an operator's instruction, the operation performed by the host connected to the storage sub-system 2 is transferred to the sub-host connected to the storage sub-system 1.

Then, the storage sub-system 1 generates, in the control memory 6, a bit map that corresponds to the data storage location for a predetermined block unit of the logical volume (first storage resource) for the storage sub-system 1. And, based on the correlation between the sequence number and the updated data position information, both of which are stored in the storage sub-system 1 as differential data that is not reflected to the storage sub-system 3, the storage sub-system 1 renders ON the bit at the pertinent position of the bit map for which the data has been updated (S172).

Further, the differential data, which is stored in the logical volume of the storage sub-system 1 at the position corresponding to the position in the bit map where the bit has been rendered ON, is copied from the storage sub-system 1 to the storage sub-system 3 (S173). When the copying is completed, the temporary operation is initiated in the form where the data is copied from the storage sub-system 1 using a synchronous transfer (S174).

To change to the temporary operation, even when a blockage has occurred in the storage sub-system 2, not all the data in the storage sub-system 1 need be copied to the storage sub-system 3, only the differential data. Therefore, even when a satisfactory amount of data is not transmitted along the communication line between the storage sub-systems 1 and 3, the data stored in the logical volumes of the storage sub-systems can be easily synchronized.

An explanation will now be given for the process sequence performed when the storage sub-system 2 is recovered from the blockage and the temporary operation is changed to the normal operation.

Figure 22:
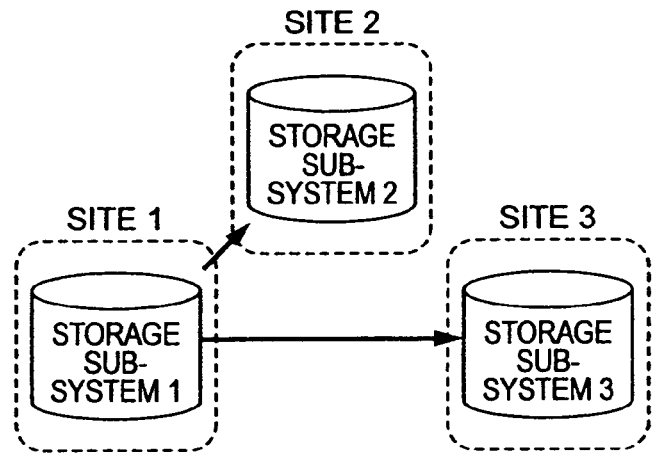
FIG. 22 is a diagram showing the state of data transmission between the storage sub-systems when the multi-hop type is being switched from temporary use to normal use.

First, the storage sub-system 1 copies all the data stored in its logical volume (first storage resource) to the logical volume (second storage resource) of the storage sub-system 2, and the operation is initiated using synchronous transfers wherein data is copied from the storage sub-system 1 to the storage sub-system 2. At this time, the asynchronous transfers between the storage sub-systems 1 and 3 are also continued. The storage sub-system 1 transmits, to the storage sub-system 2, the data written by the host and the sequence number provided in the data writing order. The storage sub-system 1 also transmits to the storage sub-system 3 the written data and the sequence number that were provided. The storage sub-system 2 stores the correlation between the write position information, which specifies the position of its logical volume (second storage resource) whereat the data was written, and the sequence number, which is provided in the data writing order (prepares a position information management table). The operating state at this time is shown in FIG. 22.

The storage sub-system 3 receives the data and the sequence number from the storage sub-system 1, stores the data in its own logical volume (third storage resource), and transmits the correlated sequence number to the storage sub-system 2.

The storage sub-system 2 receives the sequence number from the storage sub-system 3. The storage sub-system 2 then compares the received sequence number with the correlation stored in the storage sub-system 2, so that the data not reflected to the logical volume of the storage sub-system 3, i.e., the differential data, can be obtained.

Then, during the temporary operation, the asynchronous transfer copying of the data from the storage sub-system 1 to the storage sub-system 3 is halted. After the asynchronous transfer is halted, the storage sub-system 2 generates, in its control memory, a bit map that is correlated with the data storage position for a predetermined block unit of the logical volume (second storage resource) of the storage sub-system 2. Then, based on the correlation between the sequence number and the write position information that are stored in the storage sub-system 2 for the differential data that is not reflected to the storage sub-system 3, the storage sub-system 2 renders ON a bit at the pertinent position in the bit map for which the data has been updated.

Next, when the storage sub-system 2 obtains, from the bit map, the differential data that is not yet reflected to the logical volume (third storage resource) of the storage sub-system 3 and the write position information, the storage sub-system 2 transmits them to the storage sub-system 2.

Figure 23:
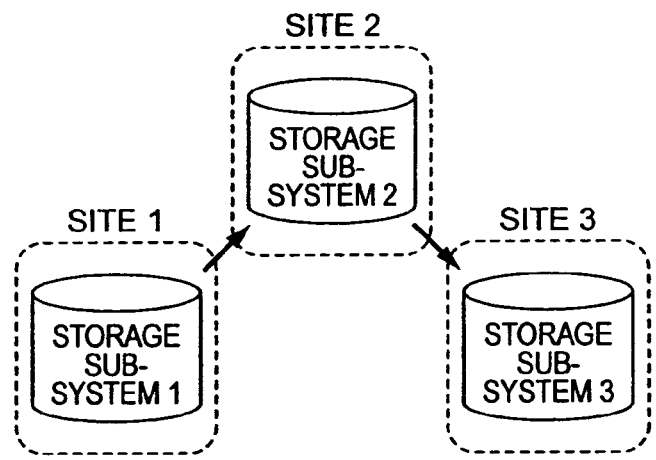
FIG. 23 is a diagram showing the state of data transmission between the storage sub-systems when the multi-hop type is being switched from temporary use to normal use.

The storage sub-system 3 receives the differential data and the write position information, and stores the differential data in its logical volume (third storage resource) based on the write position information. As a result, synchronization can be obtained between the contents of the logical volume (second storage resource) of the storage sub-system 2 and the contents of the logical volume (third storage resource) of the storage sub-system 3. The asynchronous transfer from the storage sub-system 2 to the storage sub-system 3 is then begun. The operation state at this time is shown in FIG. 23.

When the data has been written from the host to the storage sub-system 1 connected thereto, and when synchronization is obtained between the storage sub-systems 1 and 2, the copying of data from the storage sub-system 1 to the storage sub-system 2 is changed to the copying of data from the storage sub-system 2 to the storage sub-system 1. That is, since the operation is switched while the data are synchronized, an extra process, such as the copying of differential data, is not required.

Figure 24:
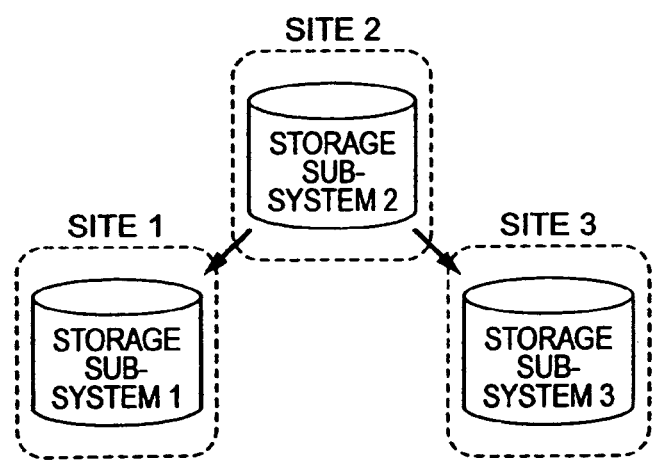
FIG. 24 is a diagram showing the state of data transmission between the storage sub-systems after the multi-hop type has been switched from temporary use to normal use.

Following this, the job performed by the host connected to the storage sub-system 1 is transferred by the host connected to the storage sub-system 2. When the synchronous transfer copying of data from the storage sub-system 2 to the storage sub-system 3 is begun, the operation in the normal state in FIG. 24 is resumed.

Through the above processing, the switching from the temporary operation to the normal operation is completed.

<Another Blockage Removal Method>

A variation of the blockage removal method will now be explained.

Figure 25A:
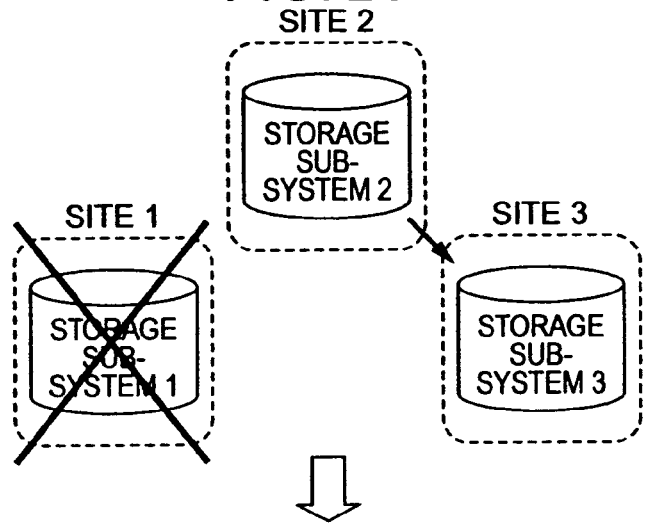
FIGS. 25A to 25C are diagrams for explaining a variation of the blockage recovery method of a multi-hop type.
Figure 25B:
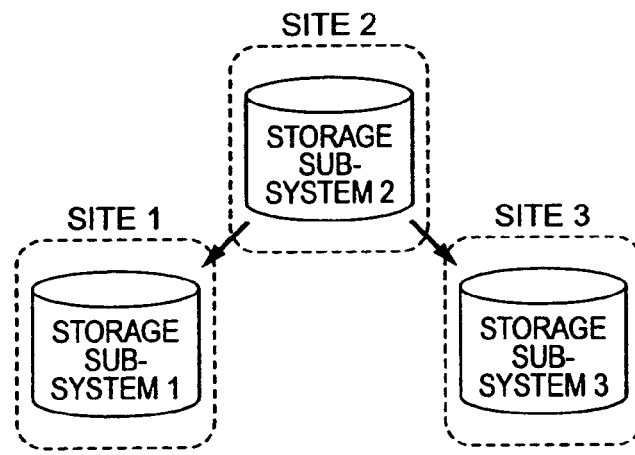

When the storage sub-system 1 breaks down in the multi-hop system shown in FIG. 25 (FIG. 25A), the sub-host is connected to the storage sub-system 2, and transfers the job of the host connected to the storage sub-system 1. It should be noted that the operation using the asynchronous transfer is performed between the storage sub-systems 2 and 3 (FIG. 25B).

Figure 25C:
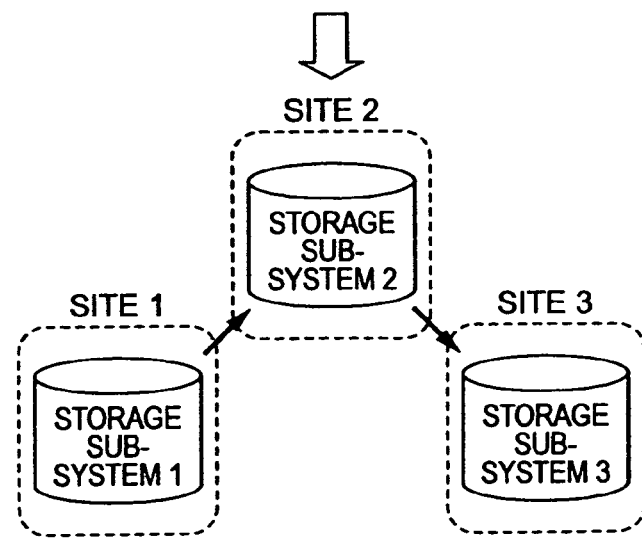

When the storage sub-system 1 is recovered, first, all the data in the storage sub-system 2 is copied to the storage sub-system 1, and the job of the sub-host is transferred by the host connected to the storage sub-system 1. In the above described manner, the data transfer direction is reversed between the storage sub-systems 1 and 2, and the normal operation is resumed (FIG. 25C).

Figure 26A:
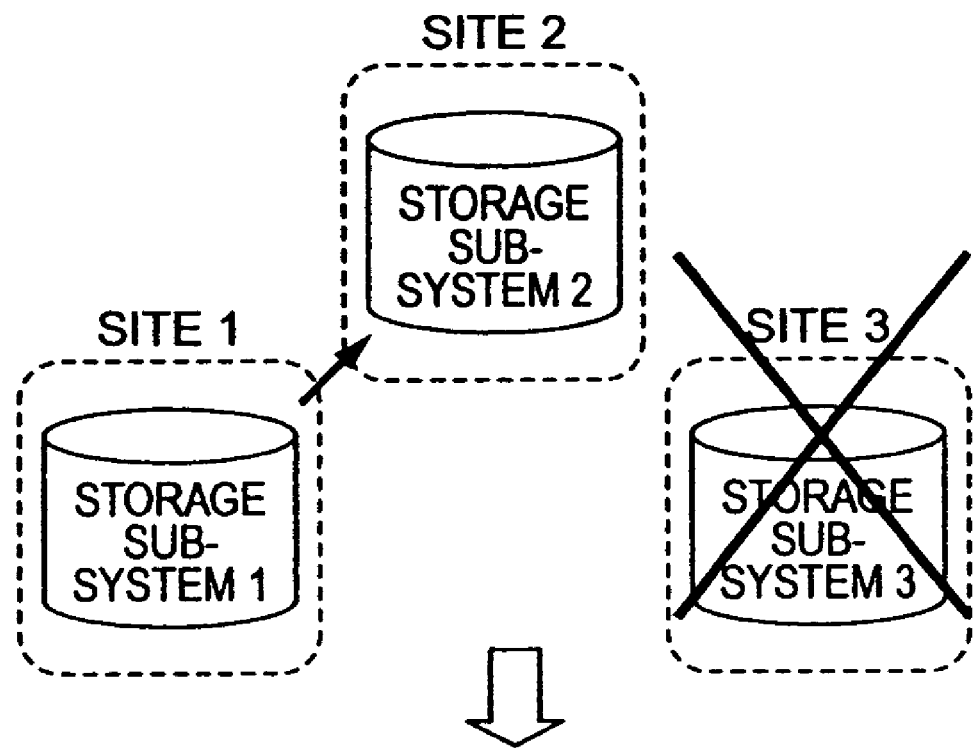
FIGS. 26A and 26B are diagrams for explaining another variation of the blockage recovery method of a multi-hop type.
Figure 26B:
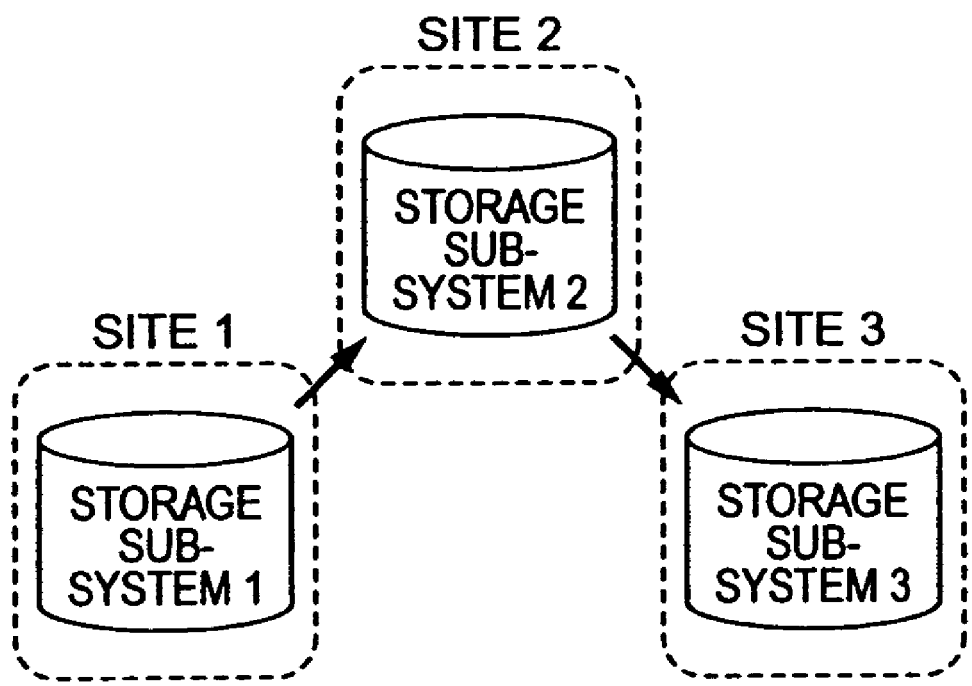

When a blockage has occurred in the storage sub-system 3 in the multi-hop system in FIG. 26 (FIG. 26A), the storage sub-system 3 is recovered, all the data is copied from the storage sub-system 2 to the storage sub-system 3 to obtain synchronization between the data in the storage sub-systems 2 and 3, and the normal operation is resumed by performing the synchronous transfer copying of data from the storage sub-system 1 to the storage sub-system 2, and by the asynchronous transfer copying of data from the storage sub-system 2 to the storage sub-system 3 (FIG. 26B).

Figure 27A:
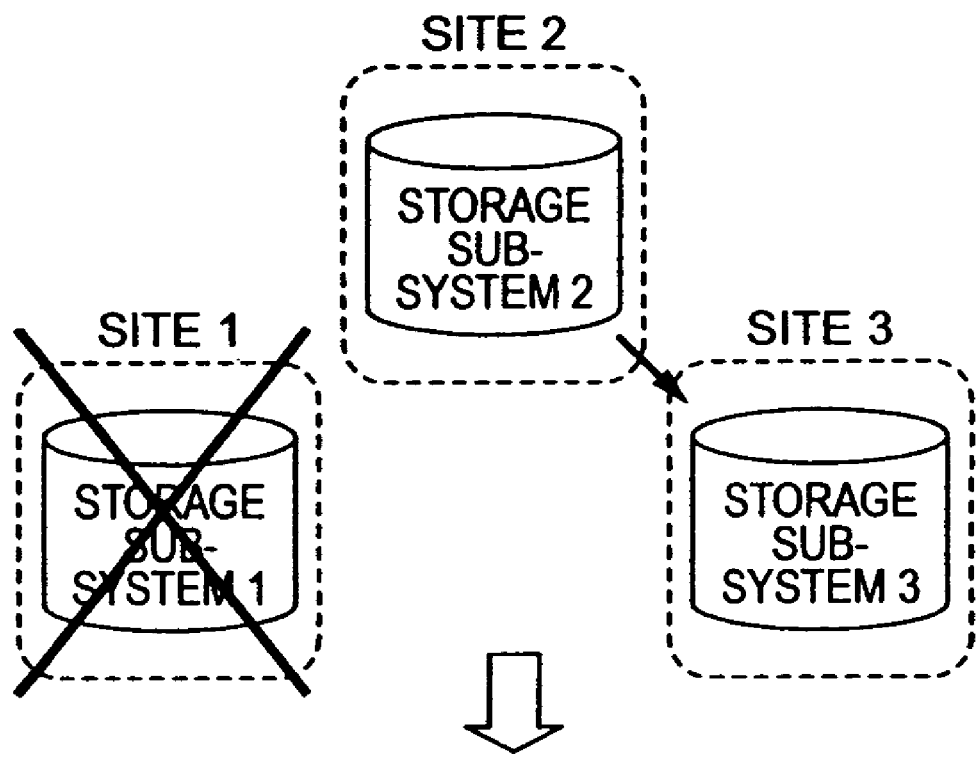
FIGS. 27A and 27B are diagrams for explaining a further variation of the blockage recovery method of a multi-copy type.
Figure 27B:
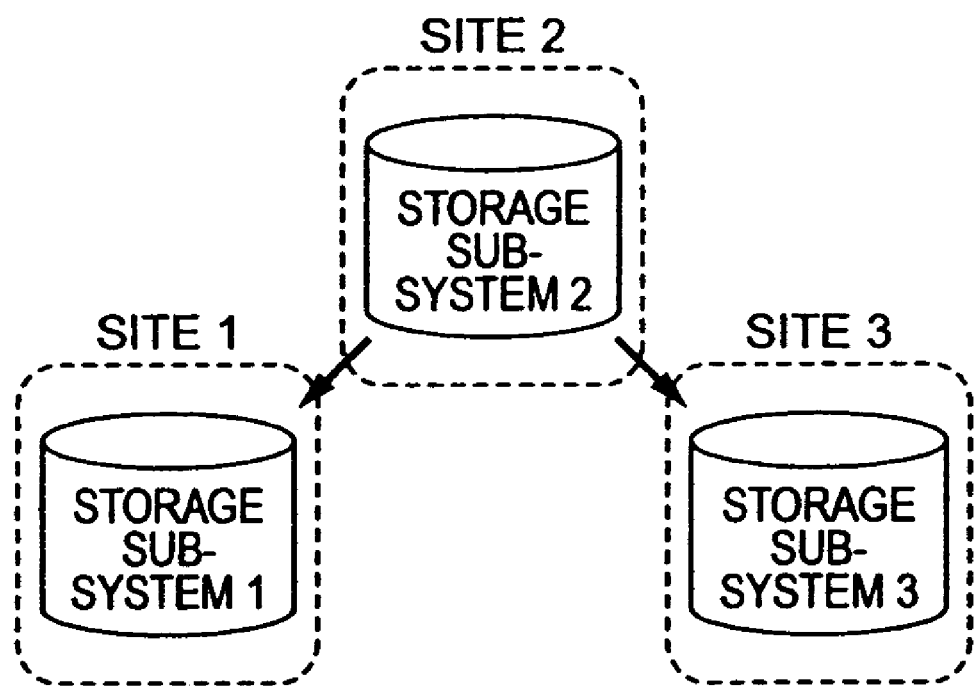

When a blockage has occurred in the storage sub-system 1 in the multi-copy system in FIG. 27 (FIG. 27A), the storage sub-system 1 is recovered, all the data is copied from the storage sub-system 1 to the storage sub-system 1 to obtain synchronization between the data in storage sub-systems 1 and 2, and the normal operation is resumed by performing synchronous transfer copying of data from the storage sub-system 2 to the storage sub-system 1 and by performing asynchronous transfer copying of data from the storage sub-system 2 to the storage sub-system 3 (FIG. 27B).

Figure 28A:
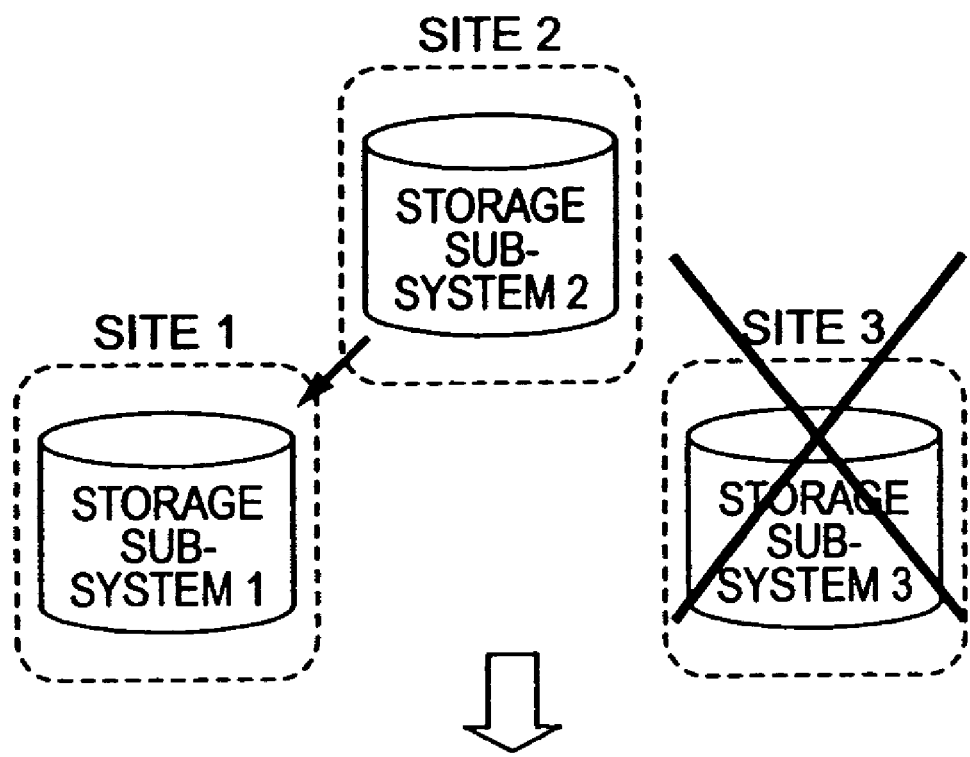
FIGS. 28A and 28B are diagrams for explaining a still further variation of the blockage recovery method of a multi-copy type.
Figure 28B:
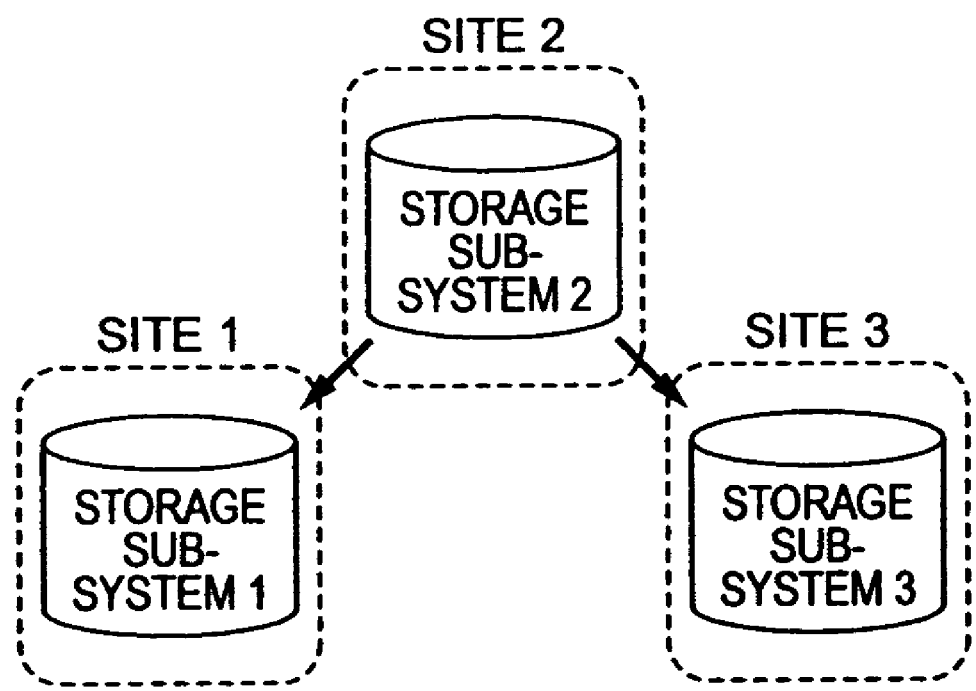

When a blockage has occurred in the storage sub-system 3 in the multi-copy system in FIG. 28 (FIG. 28A), the storage sub-system 3 is recovered, and all the data is copied from the storage sub-system 2 to the storage sub-system 3 to obtain synchronization between the data in the storage sub-systems 2 and 3, and the normal operation is resumed by performing the synchronous transfer copying of data from the storage sub-system 2 to the storage sub-system 1 and by performing the asynchronous transfer copying of data from the storage sub-system 2 to the storage sub-system 3 (FIG. 28B).

<Management of Write Position Information at a Copy Source and a Copy Destination>

For the transmission of data among the storage sub-systems, the data transmission source and destination and the use of the synchronous transfer or the asynchronous transfer method is designated in various forms depending on the system configuration; for example, for this designation an operator may manipulate each storage sub-system (in this case, when a specific storage sub-system can not be used due to a blockage, a storage sub-system, as the next data transmission source, and a storage sub-system, as the next transmission destination, are registered in advance when the system is arranged), or a system attached to a storage sub-system may automatically perform the designation.

The correlation between the sequence number and the write position information is managed at the time whereat, for example, an operator begins to register the transmission source and the transmission destination for the storage sub-system.

<Method for Selecting a Storage Sub-system>

Figure 29:
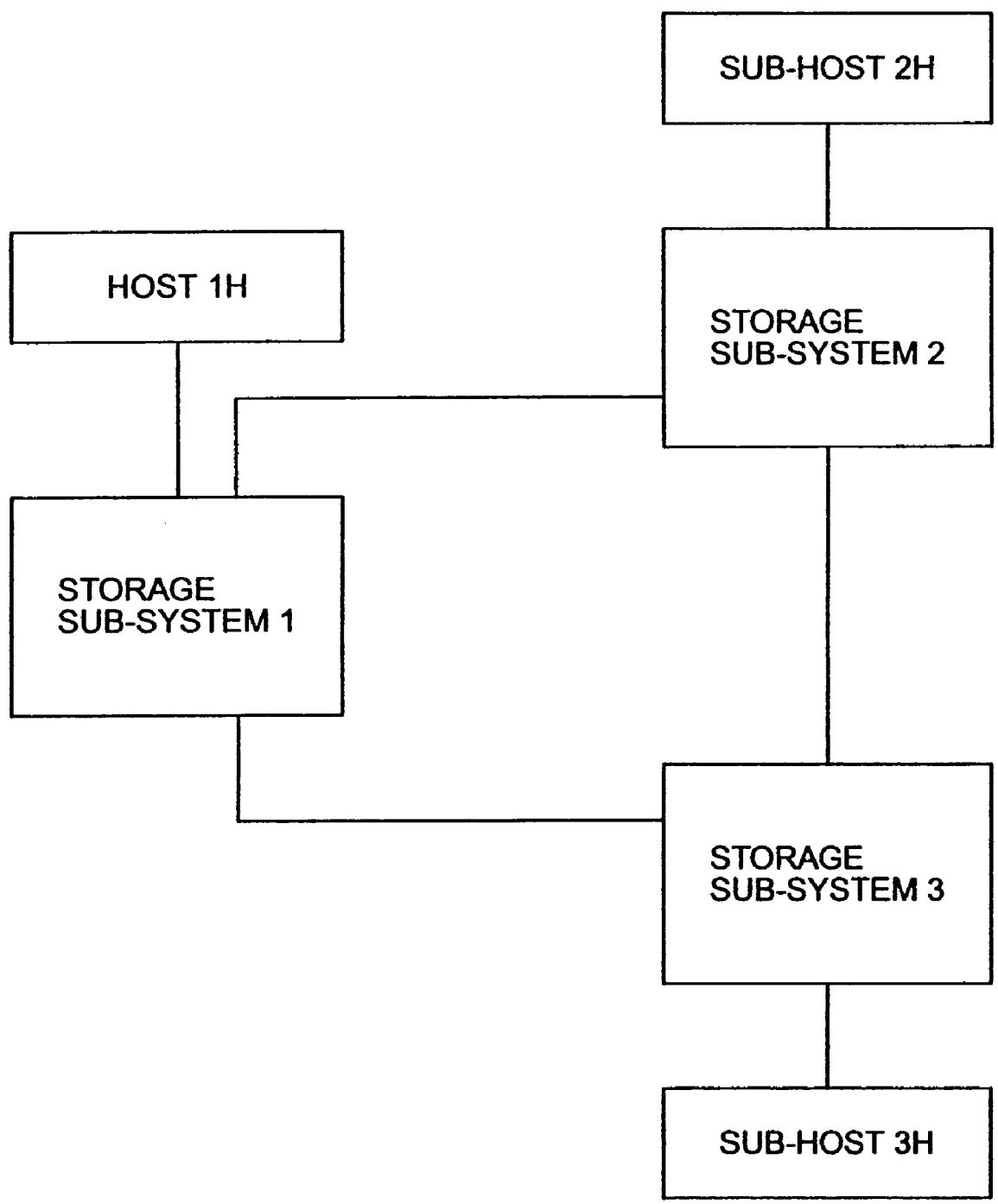
FIG. 29 is a conceptual diagram showing a large area data storage system for explaining a method for, when a blockage occurs, selecting a storage sub-system that serves as a proxy for the current operation.

A large area data storage system in FIG. 29 comprises: a storage sub-system 1; a host 1h connected thereto; and storage sub-systems 2 and 3 for asynchronously receiving data from the storage sub-system 1. When a blockage has occurred in the host 1h, or the storage sub-system 1, one of the storage sub-systems 2 and 3 is immediately selected as the primary storage sub-system, and in order to maintain reliability and security, the data is doubly managed by the storage sub-systems 1 and 3. An explanation will now be given for the processing performed when a blockage has occurred in the host 1h or the storage sub-system 1.

The storage sub-system 2 detects the occurrence of a blockage in the host 1h or the storage sub-system by determining, for example, whether data has been transmitted by the storage sub-system 1, or by monitoring a heart beat message transmitted by the storage sub-system 1 at a predetermined time.

Upon the detection of the blockage, the storage sub-system 2 quickly determines the primary sub-system, and changes the operation to the temporary operation using a sub-host 2 or 3. The selection of the primary storage sub-system is performed as follows. First, upon the detection of the blockage, the storage sub-system 2 transmits, to the storage sub-system 3, a message requesting the transmission of the latest sequence number. Upon receiving this message, the storage sub-system 3 transmits the latest stored sequence number to the storage sub-system 2.

The storage sub-system 2 compares the sequence number received from the storage sub-system 3 with the latest sequence number stored in the storage sub-system 2. The storage sub-system 2 then selects, as the primary storage sub-system, a storage sub-system that has received the later sequence number, stores the identifier of the selected storage sub-system as a selection choice, and transmits the identifier to the storage sub-system 3. Based on the received identifier, the storage sub-system 3 identifies the storage sub-system that has been selected as the primary storage sub-system.

During this selection process, due to matters such as the properties of a communication method used by the storage sub-systems, of the sequence numbers stored in the storage sub-system 2 or 3 a sequence number may be omitted. In this case, the latest sequence number of the available sequential sequence numbers is employed for the above comparison.

When the primary storage sub-system is selected, the matching of the data contents stored in the storage sub-systems 2 and 3 is obtained in order to perform the double management of the data using the storage sub-systems 2 and 3. This matching is performed by copying all of the data or differential data between the storage sub-systems 2 and 3. When between the storage sub-systems 2 and 3 the data match, the storage sub-system selected as the primary storage sub-system transmits to the sub-host connected thereto a message indicating that the pertinent storage sub-system is serving as the primary storage sub-system. Upon receiving this message, the sub-host begins the operation as a proxy. Further, double data management using either synchronous transfers or asynchronous transfers is initiated by the storage sub-systems 2 and 3.

In the above explanation, the storage sub-system 2 obtains the latest sequence number from the storage sub-system 3 and selects the primary storage sub-system. However, the storage sub-system 3 may perform this process.

In addition, for a large area data storage system constituted by three storage sub-systems 1 to 3, an example method has been explained for selecting a specific storage sub-system that is employed as a proxy when a blockage has occurred in the storage sub-system 1. This method can be employed for a large area data storage system constituted by four or more storage sub-systems.

<Management of Data in a Cache Memory>

For a system wherein at least one secondary storage sub-system, which is a destination for the remote copying of data in the primary storage sub-system connected to a host, is connected to the primary storage sub-system, an example for the management of data in the cache memory of the primary storage sub-system will now be explained.

In this system, data that do not need to be copied (remote copying) from the primary storage sub-system to the secondary storage sub-system may be deleted from the cache memory of the primary storage sub-system after the data have been written to the storage resource of the primary storage sub-system. When the data is to be copied to the secondary storage sub-system, this data must be maintained in the cache memory at least until the data has been transmitted to the secondary storage sub-system. Further, when a plurality of secondary sub-systems are present as transmission destinations, generally, the data is not transmitted at the same time to these secondary storage sub-systems because of differences in communication means and in operations. Therefore, in this case, the data must be maintained until the data has been transmitted to all the secondary sub-systems.

Figure 30:
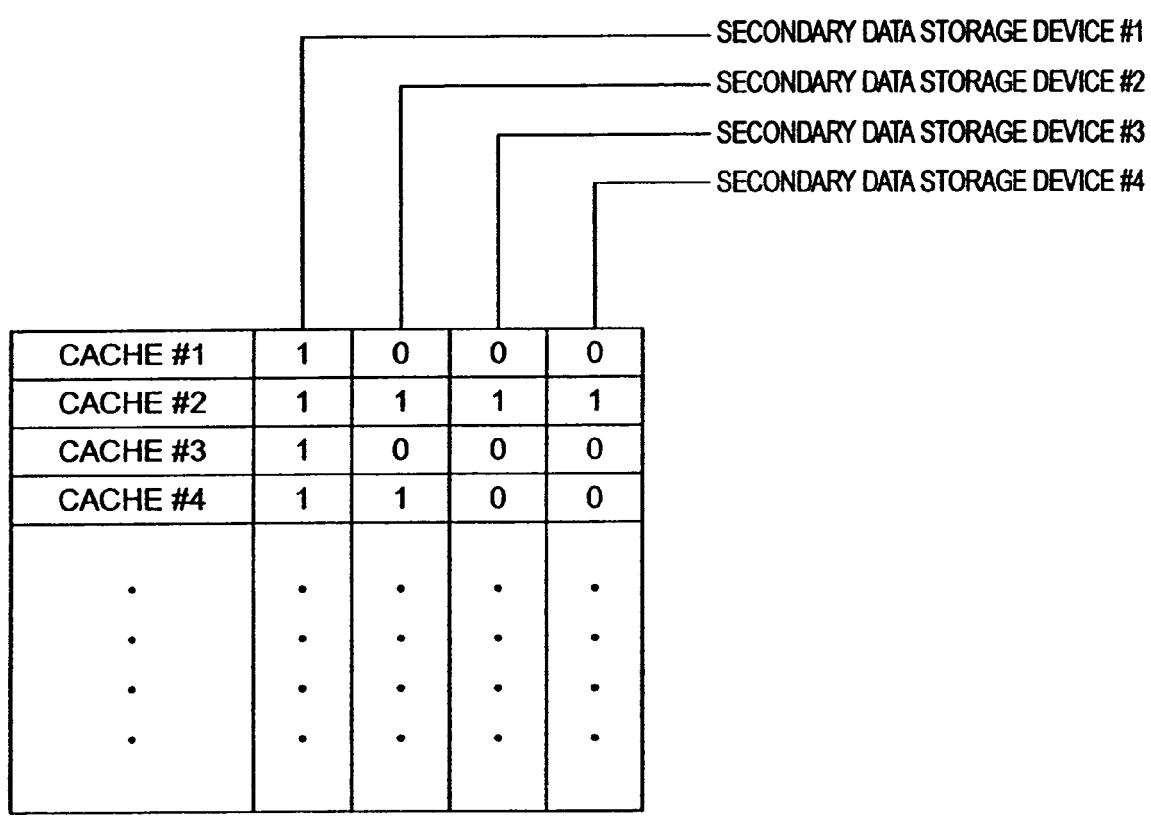
FIG. 30 is a diagram showing a table for managing the state of the transmission of data to each secondary storage sub-system, for a method according to the embodiment for managing data in a cache memory.

Thus, the primary storage sub-system manages the data to determine whether the data stored in its cache memory has been transmitted to all the secondary storage sub-systems connected to the primary storage sub-system. Specifically, for example, as is shown in FIG. 30, for each of the storage blocks (#1 to #n) defined in the cache memory, the primary storage sub-system manages a table indicating whether the data stored in the storage block has been transmitted to each secondary storage sub-system.

In this table, bit "0" indicates that the transmission is completed, and bit "1" indicates that the transmission is incomplete. When the data from the host is written to the primary storage sub-system, "1" is set for the bit that corresponds to a secondary storage sub-system that is defined as a transmission destination for the storage block to which the data is written. Among the "1" bits for a specific block, a bit for the secondary storage sub-system for which the data transmission has been completed is set to "0".

The data stored in the storage blocks, the bits for which have been set to "0" for all the secondary storage sub-systems, can be deleted from the cache memory.

In the large area data storage system in FIGS. 1, 9 and 10 having three or more sites, macroscopically, a logical volume that can consistently guarantee the data order whenever a disaster or a blockage occurs can be maintained for an arbitrary site.

In accordance with the effects of the invention, when only the differential data is copied between the logical volumes that do not directly relate to the data transmission, e.g., the storage sub-systems 1 and 3 in FIG. 7, the pair of logical volumes for asynchronous remote copying can be generated immediately, and the operation of the large data storage system can be quickly resumed.

Further, in the invention, since a redundant logical volume is not required in the storage sub-system in order to perform remote copying, the efficiency in the use of the memory resources of the storage sub-system can be increased, and the cost performance of the storage sub-system can be improved.

It should be further understood by those skilled in the art that the foregoing description has been made on embodiments of the invention and that various changes and modifications may be made in the invention without departing from the spirit of the invention and the scope of the appended claims.

<Large Area Data Storage System Using Path Replacement>

Figure 31:
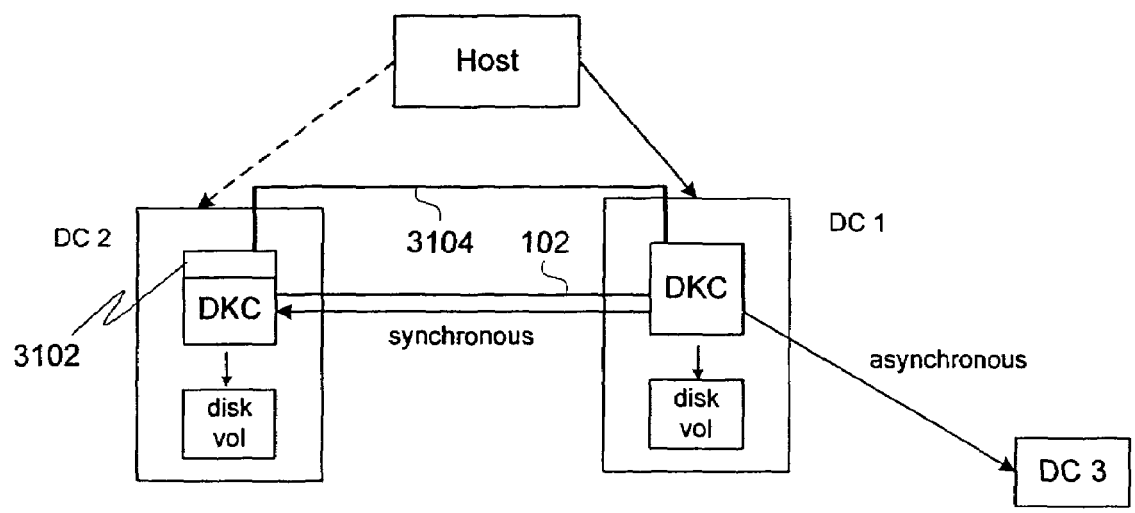
FIG. 31 illustrates a three data center configuration according to another embodiment of the present invention.

FIG. 31 shows a three data center configuration using a path replacement method and apparatus such as disclosed in U.S. application Ser. No. 10/382,872, filed Mar. 7, 2003. A host machine is connected to a data center DC 1 and to a data center DC 2. The connection between the host and the data center DC 1 is "active", as indicated by the solid line. The connection between the host and the data center DC 2 is "inactive", as indicated by the broken line. The host machine sends write requests (as well as read requests) over the active line to data center 1 (DC 1). The data center DC 1 services the write request by writing the data associated with the write request to disk volume(s) in DC 1. The data center DC 1 then performs a synchronous transfer of data written to DC 1 to the data center 2 (DC 2) which serves as a synchronous remote copy site, at some later time. The data center DC 1 also performs an asynchronous transfer of data written to DC 1 to a data center DC 3 which serves as an asynchronous remote copy site at some later time.

The disk controllers DKCs respectively of data centers DC 1 and DC 2 are in data communication over a first communication path 102. Synchronous transfer of data from the data center DC 1 to the data center DC 2 occurs of the first communication path 102. The disk controller DKC of the data center DC 2 includes a path replacement controller 3102. An example embodiment of a path replacement controller can be found in U.S. application Ser. No. 10/382,872. A second communication path 3104 is provided between the path replacement controller and the disk controller DKC of the data center DC 1.

Figure 32A:
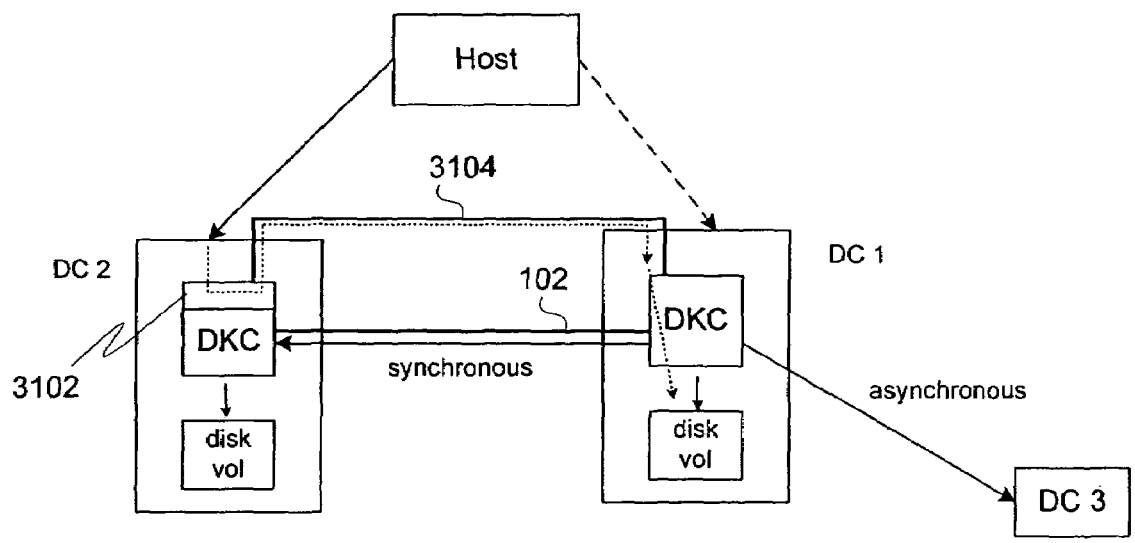
FIGS. 32A and 32B show switching between two data centers.

In the configuration shown in FIG. 31, the data center DC 1 serves as the main data center. The data center DC 2 serves as a standby site. Referring to FIG. 32A, data center DC 2 is shown operating as the main data center, as indicated by the active connection between the host and the data center DC 2. In the particular configuration of FIG. 32A, the path replacement controller 3102 receives I/O requests from the host directs the requests back to the data center DC 1, where the request is serviced by the disk volume(s) in the data center DC 1. Synchronous transfers continue to be provided from the data center DC 1 to the data center DC 2 over the first communication path 102. Thus, any write requests made by the host will be serviced by the data center DC 1 (by way of data center DC 2) and the data of the write requests will continue to be backed up to the data center DC 2.

Figure 32B:
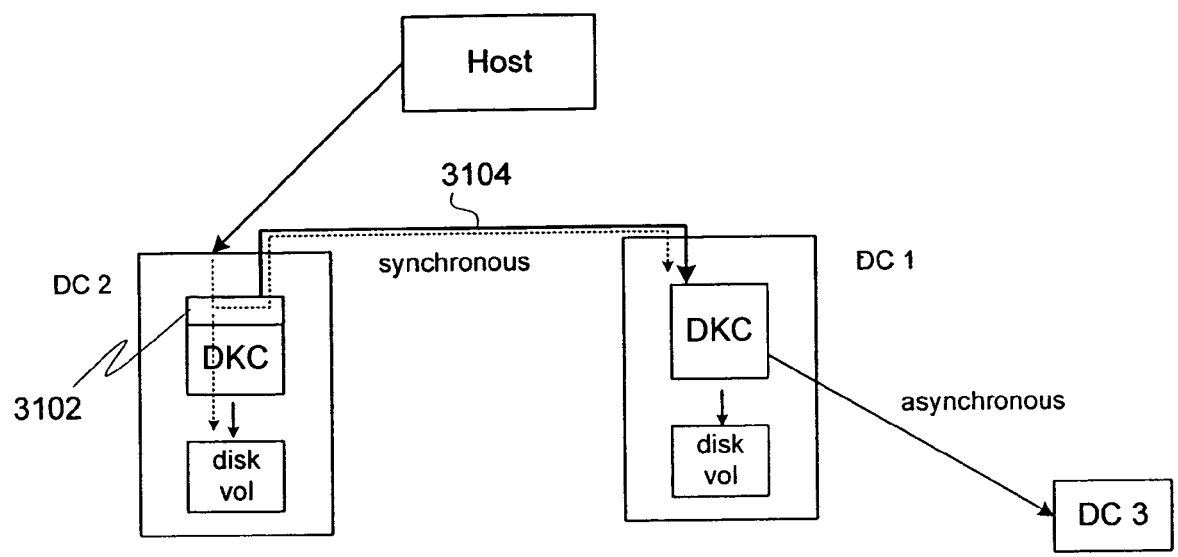

Referring now to FIG. 32B, the data center DC 1 is configured to serve as the remote copy site. The synchronous transfers are performed over the second communication path 3104. Thus, when the host makes a write request, the path replacement controller 3102 can direct the write request to the DKC of the data center DC 2 to service the request locally in the disk volume(s) of DC 2. Also, the path replacement controller 3102 can send the write request to the data center DC 1, where the data can stored in the disk volume(s) of DC 1. The data center DC 1 continues to perform the asynchronous data transfer of data written to DC 1 to the data center DC 3.

Figure 33:
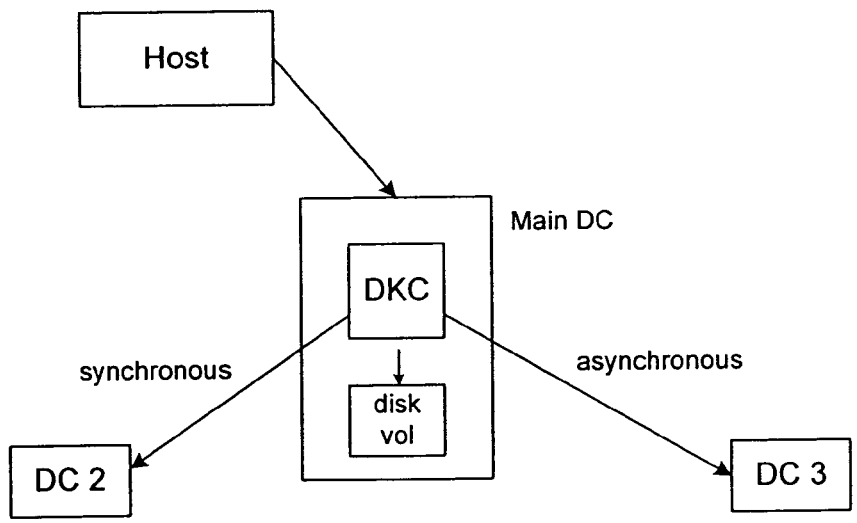
FIG. 33 shows a simplified representation of the three data center configuration shown in FIG. 1.

FIG. 33 is a simplified representation of the storage configuration show in FIG. 1. A host is in communication with a data center designated as the main data center. The main data center perform synchronous transfers of data written to the main data center to a data center DC 2. Also, the main data center performs asynchronous data transfers to a data center DC 3.

Figure 34:
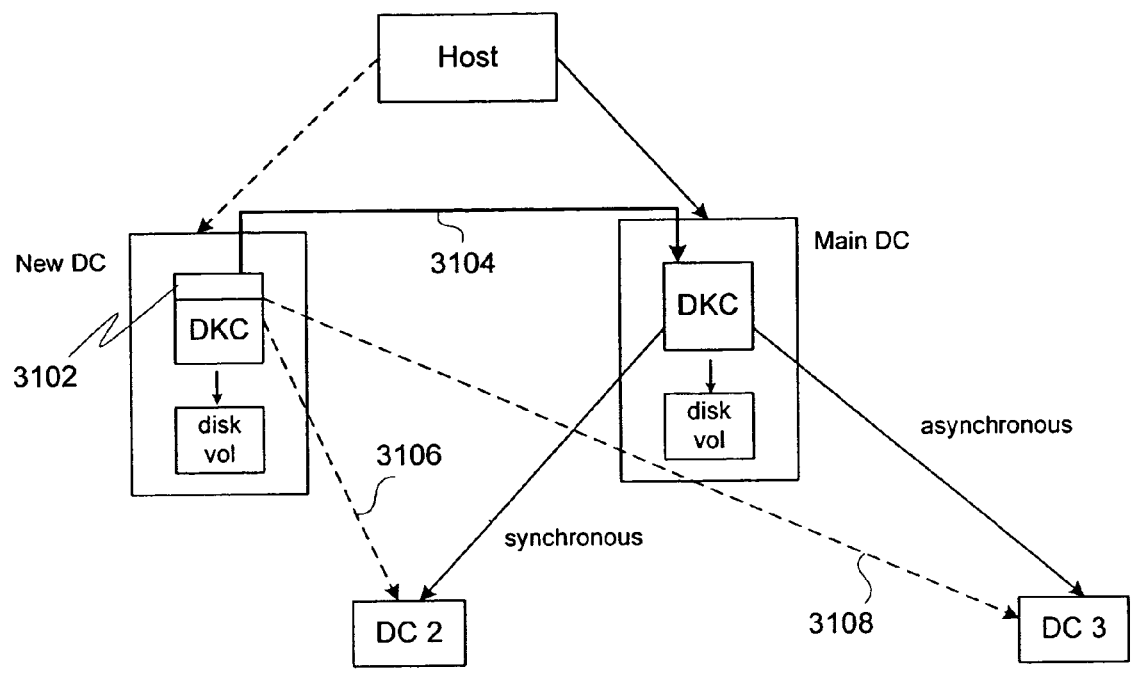
FIG. 34 shows the addition of a new data center to the configuration shown in FIG. 33 to illustrate another embodiment of the present invention.

FIG. 34 shows a new data center having been installed in the storage configuration of FIG. 33. The new data center includes a path replacement controller 3102 (disclosed in more detail in U.S. application Ser. No. 10/382,872). A communication path 3104 connects the path replacement controller 3102 to the disk controller in the main data center. A connection is provided between the host and the new data center, which in FIG. 34 is shown as being inactive as indicated by the dashed line. A communication path 3106 is shown between the disk controller DKC of the new data center and the data center DC 2, which is also inactive. A similar inactive communication path 3108 is provided between the disk controller of the new data center and the data center DC 3.

Figure 34A:
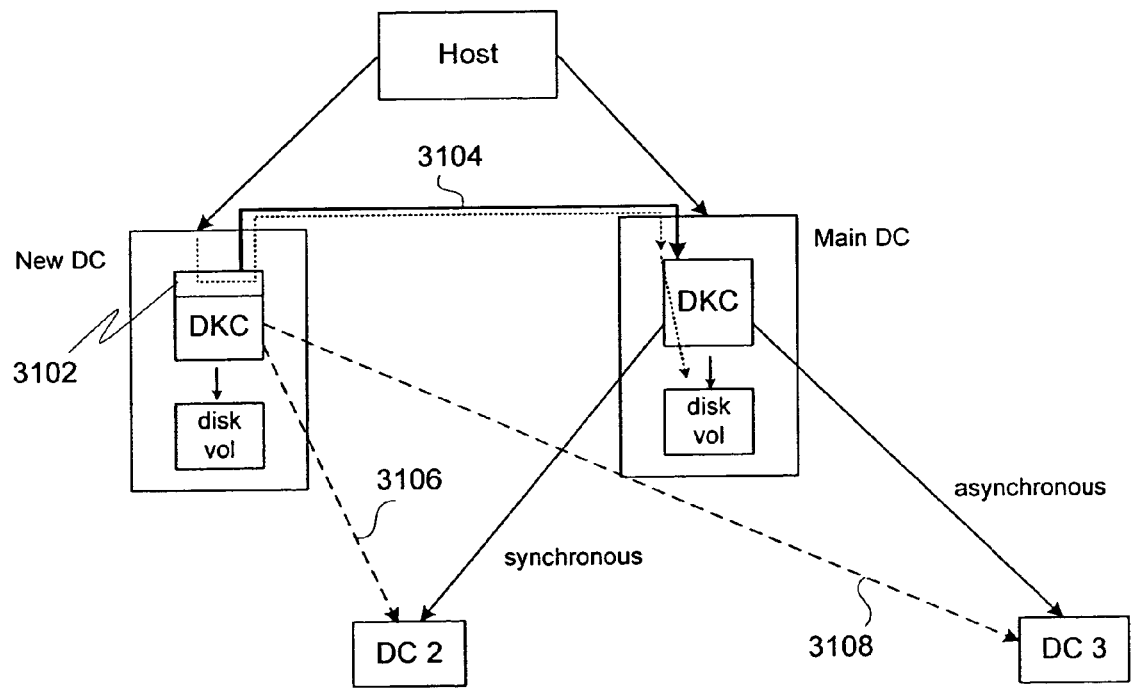
FIGS. 34A and 34B shows switchover to the new data center shown in FIG. 34.

FIG. 34A shows that both of the host connections to the main data center and to the new data center are active, as indicated by the solid lines. A write request made by the host that is directed to the main data center is serviced by the disk controller in the main data center. A write request made by the host that is directed to the new data center is intercepted by the path replacement controller 3102 and directed to the main data center over the communication path 3104. This configuration allows the new data center to be brought online without disruption of services provided by the host.

Figure 34B:
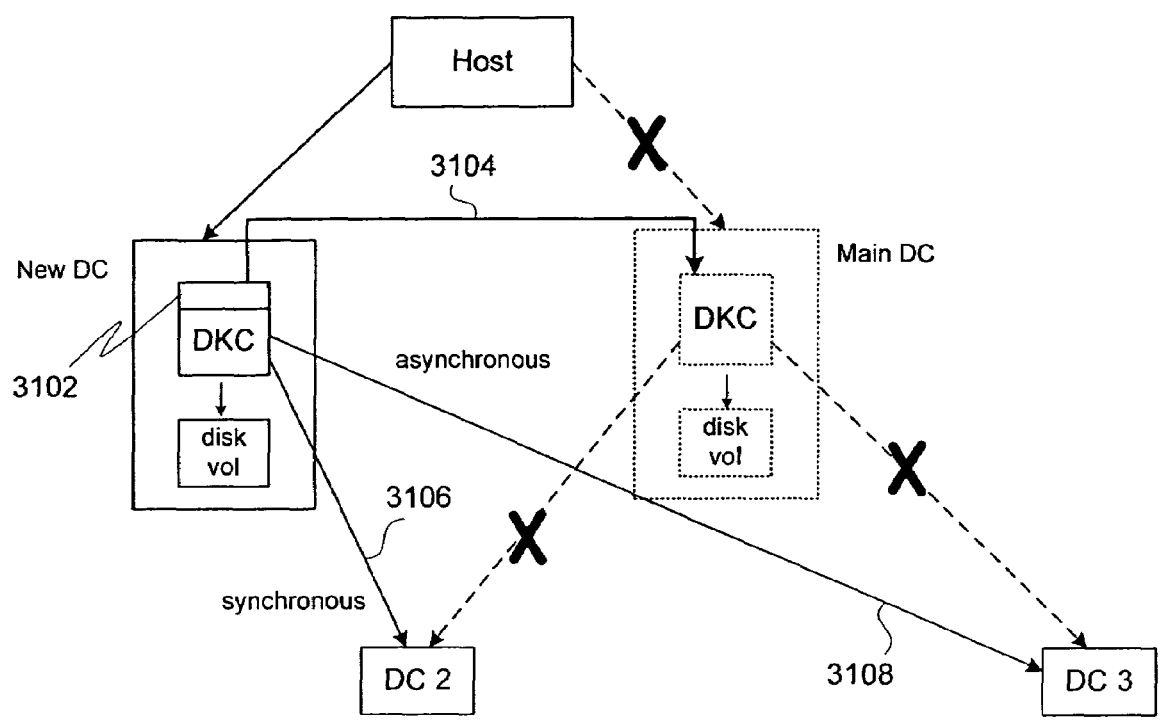

FIG. 34B shows the situation where the host connection to the main data center is made inactive (e.g., cutover to the new data center is performed). The new data center no longer sends write requests from the host to the main data center over the communication path 3104, but rather services the requests by accessing it own disk volume(s). In addition, the disk controller DKC in the new data center is activated so that it performs synchronous transfers to the data center DC 2 and asynchronous transfers to the data center DC 3.

What is claimed is:

1. A storage system comprising:
   a first storage component configured for connection to a host and operative to receive write requests from the host;
   a second storage component configured for synchronous data transfer of data from the first storage component; and
   a third storage component configured for asynchronous data transfer of data from the first storage component,
   the first storage component comprising a first disk controller,
   the second storage component comprising a path replacement controller,
   the storage system further comprising a first communication path between the path replacement controller and the first disk controller,
   the path replacement controller operative to receive a first write request from the host and to communicate data associated with the first write request to the first storage component.

2. The storage system of claim 1 wherein the second storage component is operative to service the first write request by storing the data associated with the first write request to a data volume in the second storage component.

3. A storage system comprising:
   a first storage component comprising a disk controller and configured for connection to a host and operative to receive write requests from the host;
   a second storage component configured for synchronous data transfer of data from the first storage component;
   a third storage component configured for asynchronous data transfer of data from the first storage component;
   a fourth storage component comprising a path replacement controller; and
   a communication path between the path replacement controller and the first disk controller,
   the path replacement controller operative to receive a first write request from the host and to communicate the first write request to the first storage component.

4. A remote copy method in a storage system comprising a first storage sub-system configured for communication with a host system and operative to exchange data with the host, a second storage sub-system in data communication with the first storage sub-system, and a third storage sub-system in data communication with the first storage sub-system, the method comprising:
   operating in a first configuration, comprising steps of:
      receiving, in the first storage sub-system, first I/O requests from the host including first read requests and first write requests;
      storing data associated with the first write requests on a data volume in the first storage sub-system;
      synchronously transferring data stored in the first storage system to the second storage system; and
      asynchronously transferring data stored in the first storage system to the third storage system; and
   operating in a second configuration, comprising steps of:
      receiving, in the second storage sub-system, second I/O requests from the first host including second read requests and second write requests;
      communicating the second I/O requests to the first storage sub-system;
      storing data associated with the second write requests on the data volume in the first storage sub-system;
      synchronously transferring data stored in the first storage system to the second storage system; and
      asynchronously transferring data stored in the first storage system to the third storage system.

5. A remote copy method in a storage system comprising a first storage sub-system configured for communication with a host system and operative to exchange data with the host, a second storage sub-system in data communication with the first storage sub-system, and a third storage sub-system in data communication with the first storage sub-system, the method comprising:
  operating in a first configuration, comprising steps of:
    receiving, in the first storage sub-system, first I/O requests from the host including first read requests and first write requests;
    storing data associated with the first write requests on a data volume in the first storage sub-system;
    synchronously transferring data stored in the first storage system to the second storage system; and
    asynchronously transferring data stored in the first storage system to the third storage system; and
  operating in a second configuration, comprising steps of:
    receiving, in the second storage sub-system, second I/O requests from the first host including second read requests and second write requests;
    storing data associated with the second write requests on a data volume in the second storage sub-system;
    synchronously transferring data associated with the second write requests to the first storage system; and
    asynchronously transferring data stored in the first storage system to the third storage system.

6. A remote copy method in a storage system comprising a first storage sub-system configured for communication with a host system and operative to exchange data with the host, a second storage sub-system in data communication with the first storage sub-system, a third storage sub-system in data communication with the first storage sub-system, and a fourth storage sub-system in communication with the first storage sub-system, the method comprising:
  receiving, in the first storage sub-system, a first write request from the host;
  storing first data associated with the first write request to data volumes in the first storage sub-system;
  synchronously transferring the first data to the second storage sub-system at a time subsequent to receiving the first write request;
  asynchronously transferring the first data to the third storage sub-system at a time subsequent to receiving the first write request;
  receiving, in the fourth storage sub-system, a second write request from the host;
  communicating the second write request to the first storage sub-system;
  storing second data associated with the second write request to data volumes in the first storage sub-system;
  synchronously transferring the second data to the second storage sub-system at a time subsequent to receiving the second write request; and
  asynchronously transferring the second data to the third storage sub-system at a time subsequent to receiving the second write request.

7. The method of claim 6 further comprising:
  receiving, in the fourth storage sub-system, a third write request from the host, wherein the host is no longer able to communicate with the first storage sub-system;
  storing third data associated with the third write request to data volumes in the fourth storage sub-system;
  synchronously transferring the third data to the second storage sub-system from the fourth storage sub-system at a time subsequent to receiving the third write request; and
  asynchronously transferring the third data to the third storage sub-system from the fourth storage sub-system at a time subsequent to receiving the third write request.

* * * * *